US012316131B2

(12) United States Patent
Puskarich

(10) Patent No.: US 12,316,131 B2
(45) Date of Patent: May 27, 2025

(54) WEARABLE LOOPS WITH EMBEDDED CIRCUITRY

(71) Applicant: Apple Inc., Cupertino, CA (US)

(72) Inventor: Paul G. Puskarich, London (GB)

( * ) Notice: Subject to any disclaimer, the term of this patent is extended or adjusted under 35 U.S.C. 154(b) by 378 days.

(21) Appl. No.: 17/525,611

(22) Filed: Nov. 12, 2021

(65) Prior Publication Data
US 2022/0069625 A1    Mar. 3, 2022

Related U.S. Application Data

(63) Continuation of application No. 16/556,125, filed on Aug. 29, 2019, now Pat. No. 11,177,693.

(60) Provisional application No. 62/728,304, filed on Sep. 7, 2018.

(51) Int. Cl.
*H02J 50/10* (2016.01)
*H02J 7/00* (2006.01)
*H02J 50/00* (2016.01)

(52) U.S. Cl.
CPC ............ *H02J 50/10* (2016.02); *H02J 7/0044* (2013.01); *H02J 50/005* (2020.01)

(58) Field of Classification Search
CPC ....... H04W 4/029; H04W 4/33; H04W 4/027; H04W 4/80; G01S 5/0294; G01S 5/06; G01S 13/70; G02B 27/017; G02B 2027/0178; G06F 3/14; G06F 3/011; G06F 9/542; G06F 3/016
See application file for complete search history.

(56) References Cited

U.S. PATENT DOCUMENTS

| 6,958,677 B1 | 10/2005 | Carter |
| 9,504,408 B2 | 11/2016 | Hong et al. |
| 9,599,632 B2 | 3/2017 | Yuen |

(Continued)

FOREIGN PATENT DOCUMENTS

WO    2018033132 A1    11/2018

OTHER PUBLICATIONS

Chang, Jiyoung, Electrospun Direct-write Multi-functional Nanofibers, UC Berkely Electronec Theses and Dissertations, Published in 2012, retreived from https://escholarship.org/uc/item/9n1306k1 on Aug. 29, 2019.

(Continued)

*Primary Examiner* — Vernal U Brown
(74) *Attorney, Agent, or Firm* — Treyz Law Group, P.C.; Kendall P. Woodruff

(57) ABSTRACT

An electronic device such as a loop-shaped wearable electronic device may have a fabric cord with first and second opposing ends and a housing unit coupled between the first and second ends. The housing unit may contain circuitry such as a visual output region, sensors, communications circuitry, and wireless power receiving circuitry. The wearable electronic device may include haptic output devices for providing haptic output for a user or for changing the shape of the fabric cord. The fabric cord may include a conductive strand that forms a coil for receiving wireless power signals from a wireless power transmitter. The wearable electronic device may be stored in a charging case that includes wireless power transmitting circuitry for powering the wearable electronic device. Control circuitry in the charging case may change an opacity of the charging case based on a charging status of the wearable electronic device.

19 Claims, 13 Drawing Sheets

(56) References Cited

U.S. PATENT DOCUMENTS

| | | |
|---|---|---|
| 10,200,819 B2* | 2/2019 | Hill .................. H04W 4/026 |
| 2002/0186135 A1 | 12/2002 | Wagner |
| 2008/0234009 A1 | 9/2008 | Zeiger et al. |
| 2012/0223834 A1 | 9/2012 | Hyatt |
| 2014/0002239 A1* | 1/2014 | Rayner .............. G08B 13/2462 |
| | | 340/5.61 |
| 2016/0190690 A1* | 6/2016 | Badran ................ H01Q 1/243 |
| | | 343/750 |
| 2017/0329365 A1 | 11/2017 | Wong et al. |
| 2018/0012172 A1 | 1/2018 | Rodoni |
| 2018/0211213 A1* | 7/2018 | Vivier ................ H04L 9/3239 |
| 2019/0294166 A1* | 9/2019 | Hill ........................ G05D 1/028 |
| 2019/0296574 A1 | 9/2019 | Wong et al. |

OTHER PUBLICATIONS

Powercast Corp., About Powercast, Retreived from http://www.powercastco.com/company/about/ on Aug. 29, 2019.
U.S. Appl. No. 16/140,419, filed Sep. 24, 2018.

* cited by examiner

WEARABLE LOOPS WITH EMBEDDED CIRCUITRY

This application is a continuation of patent application Ser. No. 16/556,125, filed Aug. 29, 2019, which claims the benefit of provisional patent application No. 62/728,304, filed Sep. 7, 2018, both of which are hereby incorporated by reference herein in their entireties.

FIELD

This relates generally to electronic devices and, more particularly, to wearable devices.

BACKGROUND

Electronic devices may include input-output components such as sensors and light-emitting components. It can be challenging to incorporate components such as these into a wearable device. If care is not taken, the wearable device will be overly fragile, bulky, or unattractive.

SUMMARY

An electronic device such as a loop-shaped wearable electronic device may have a fabric cord and a housing unit. The housing unit may contain circuitry such as a visual output region, sensors, communications circuitry, and wireless power receiving circuitry. The visual output region may include a status indicator or a display. The wearable electronic device may include haptic output devices for providing haptic output for a user or for changing the shape of the fabric cord. The haptic output devices may include piezoelectric fibers that form part of the fabric cord or may include magnetic structures. The haptic output devices may cause the fabric cord to change from a furled shape to an unfurled shape. The fabric may include one or more conductive strands that form a coil. The coil may be used to receive wireless power signals from a wireless power transmitter.

The wearable electronic device may be stored in a charging case that includes wireless power transmitting circuitry for powering the wearable electronic device. The charging case may include upper and lower housings and a column extending from the lower housing. The wearable electronic devices may be received on the column. Control circuitry in the charging case may change an opacity of the charging case based on a charging status of the wearable electronic device.

DETAILED DESCRIPTION

Electronic devices may be worn on a user's body or may be attached to an object. For example, an electronic device may have a loop, band, or string-like shape that can be looped around, tied to, hung on, or otherwise attached to a person, animal, or object. Electronic devices may be worn on a user's wrist or neck, may be looped through an object such as a key, pet collar, or suitcase, or may be otherwise attached to a person or object. Electronic devices that can be attached to a person, animal, or object, which are sometimes referred to as loop-shaped wearable electronic devices, string devices, or string-like electronic devices, may be used to gather information about the person or object that the electronic device is attached to (e.g., location information, activity information, identification information, medical or biometric information, etc.), may be used to gather user input (e.g., touch input, force input, motion input, and/or voice input), may be used to provide a user with output (haptic output, audio output, and/or visual output), may be used to store identification information about the person or object that the string device is attached to, may be used to store messages for a user, may be used as an anchor or visual marker in an augmented reality or virtual reality system, and/or may be used for other functions.

Figure 1:
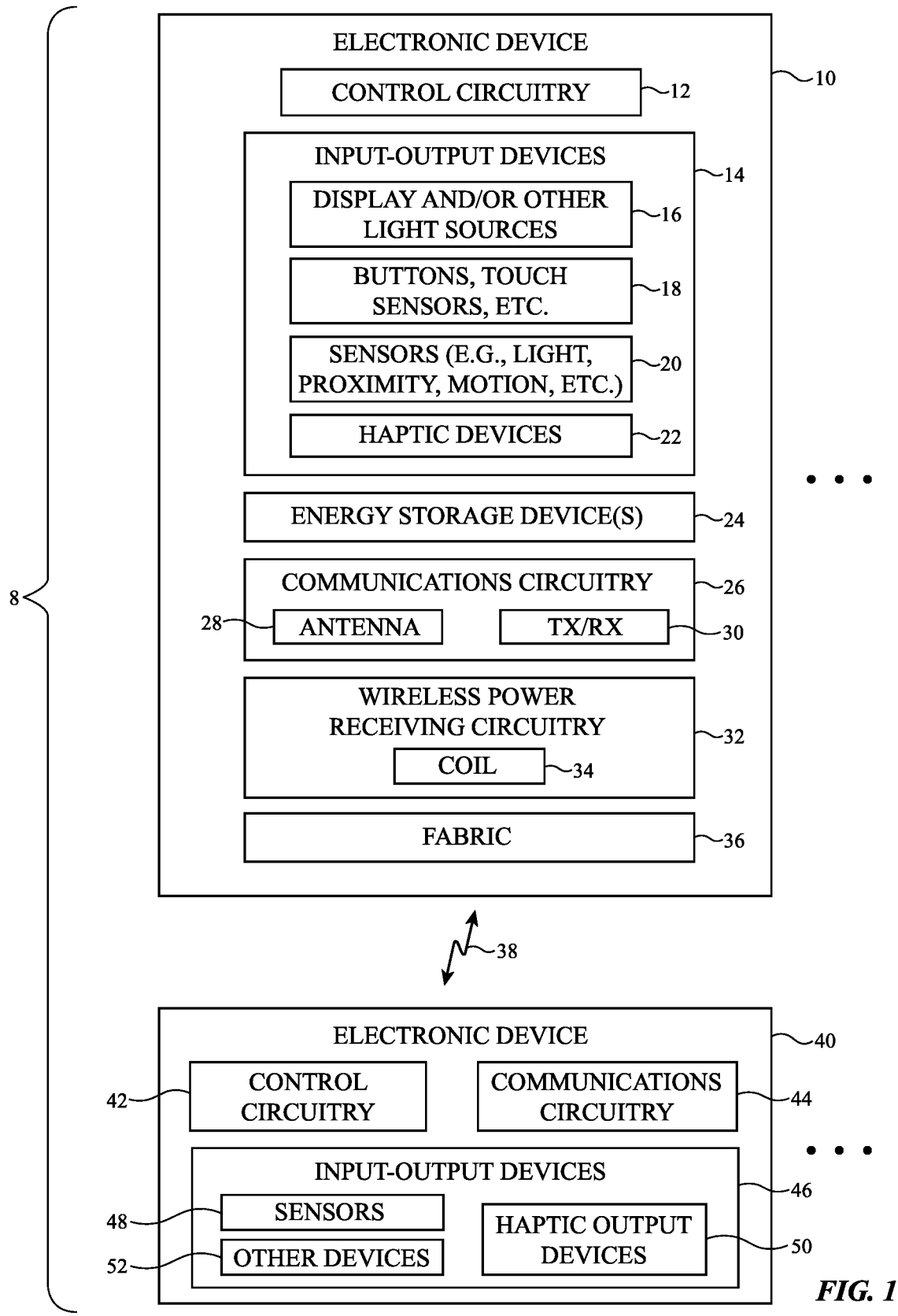
FIG. 1 is a diagram of an illustrative system including a loop-shaped wearable electronic device in accordance with an embodiment.

FIG. 1 is a schematic diagram of an illustrative system of the type that may include one or more string devices. As shown in FIG. 1, system 8 may include electronic device(s) such as loop-shaped wearable electronic device 10 and other electronic device(s) 40. Each electronic device 10 may be worn on a person (e.g., a person's wrist, arm, finger, arm, neck, waist, ankle, or other suitable body part), may be worn on an animal (e.g., cat, dog, etc.), or may be coupled to an object (e.g., a suitcase, key fob, a door knob, an electronic device, or any other suitable object). Additional electronic devices in system 8 such as devices 40 may include devices such as a laptop computer, a computer monitor containing an embedded computer, a tablet computer, a desktop computer, a cellular telephone, a media player, or other handheld or portable electronic device, a smaller device such as a wristwatch device, a pendant device, a headphone or earpiece device, a head-mounted device such as glasses, goggles, a helmet, or other equipment worn on a user's head, or other wearable or miniature device, a television, a computer display that does not contain an embedded computer, a gaming device, a remote control, a navigation device, an embedded system such as a system in which equipment is mounted in a kiosk, in an automobile, airplane, or other vehicle, a removable external case for electronic equipment, a strap, a wrist band or head band, a removable cover for a device, a case or bag that has straps or that has other structures to receive and carry electronic equipment and other items, a necklace or arm band, a wallet, sleeve, pocket, or other structure into which electronic equipment or other items may be inserted, part of a chair, sofa, or other seating (e.g., cushions or other seating structures), part of an item of clothing or other wearable item (e.g., a hat, belt, wrist band, headband, sock, glove, shirt, pants, etc.), or equipment that implements the functionality of two or more of these devices.

With one illustrative configuration, which may sometimes be described herein as an example, device 10 is a string-like wearable electronic device worn by a person, animal, or object and may be configured as a loop shape (e.g., a continuous loop of string without any end points or a loop of string formed from joining first and second opposing ends of the string) and/or a non-loop shape (e.g., a string having first and second opposing ends that are not joined), and electronic device 40 is a cellular telephone, tablet computer, laptop computer, wristwatch device, head-mounted device, a device with a speaker, or other electronic device (e.g., a device with a display, audio components, and/or other output components).

Device 10 may include control circuitry 12. Control circuitry 12 may include storage and processing circuitry for supporting the operation of device 10 and/or system 8. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 12 may be used to control the operation of device 10. The processing circuitry may be based on one or more microprocessors, microcontrollers, digital signal processors, baseband processors, power management units, audio chips, application specific integrated circuits, etc.

To support interactions with external equipment, control circuitry 12 may be used in implementing communications protocols. Communications protocols that may be implemented using control circuitry 12 include internet protocols, wireless local area network protocols (e.g., IEEE 802.11 protocols—sometimes referred to as WiFi®), protocols for other short-range wireless communications links such as the Bluetooth® protocol, cellular telephone protocols, MIMO protocols, antenna diversity protocols, satellite navigation system protocols, millimeter wave communications protocols, IEEE 802.15.4 ultra-wideband communications protocols, etc.

Device 10 of system 8 may include input-output devices 14. Input-output devices 14 may be used in gathering user input, gathering information on the environment surrounding device 10, and/or providing a user with output. Input-output devices 14 of device 10 may include light-emitting components. For example, input-output devices 14 can include devices such as a display and/or other light sources 16. Light sources 16 may include one or more individual light-emitting devices such as light-emitting diode(s), laser(s), and/or lamp(s). Light sources 16 may include status indicator lights (e.g., a light-emitting diode that serves as a power indicator, and other light-based output devices) and/or may include arrays of pixels for forming displays such as liquid crystal displays, organic light-emitting diode displays, electrophoretic displays, displays formed from Janus particles, displays formed from crystalline semiconductor dies (microLEDs), etc.

Input-output devices 14 of device 10 may include input components 18 such as buttons, touch sensors (e.g., capacitive touch sensors, optical touch sensors, etc.), force sensors, and/or other devices for receiving input such as button press input and/or touch or force sensor input.

Sensors 20 of device 10 may be used in gathering environmental measurements and/or user input and may include ambient light sensors (visible light sensors, color sensitive light sensors, ultraviolet light sensors, etc.), optical proximity sensors, capacitive proximity sensors, temperature sensors, force sensors (e.g., strain gauges, capacitive force sensors, resistive force sensors, force sensors for measuring biometric information, etc.), audio sensors such as microphones, magnetic sensors (e.g., Hall effect sensors, giant magnetoresistance sensors, or other sensors or magnetometers that measure magnetic fields), gas pressure sensors, heart rate sensors, blood oxygen level sensors (e.g., based on emitted and detected light), electrocardiogram sensors (e.g., sensors for measuring electrical signals on a user's body), humidity sensors, moisture sensors, particulate sensors (e.g., sensors that use light measurements and/or other measurements to measure particulate concentration in the air), image sensors (cameras), gas pressure sensors, carbon dioxide sensors and/or sensors measuring other gas concentrations, sensors for detecting position, orientation, and/or motion (e.g., accelerometers, magnetic sensors such as compass sensors, gyroscopes, barometers, and/or inertial measurement units that contain some or all of these sensors), radio-frequency sensors, depth sensors (e.g., structured light sensors and/or depth sensors based on stereo imaging devices), optical sensors such as self-mixing sensors and light detection and ranging (lidar) sensors that gather time-of-flight measurements, accelerometers for gathering user tap input, and/or other sensors. In some arrangements, device 10 may use sensors 20 and/or other input-output devices 14 to gather user input (e.g., buttons may be used to gather button press input, touch sensors overlapping displays can be used for gathering user touch screen input, touch pads may be used in gathering touch input, microphones may be used for gathering audio input, accelerometers may be used in monitoring when a finger contacts an input surface and may therefore be used to gather finger press input, etc.). Sensors 20 may include sensing electrodes, which may be formed from conductive strands of material in fabric such as fabric 36 (e.g., sensor electrode pads may be formed from fabric), may be formed from metal traces on printed circuits, and/or may be formed from other sense electrode structures.

If desired, input-output devices 14 may include one or more speakers and one or more microphones for providing device 10 with virtual assistant functionality for a user of device 10. For example, microphones in device 10 may receive voice input commands and speakers in device 10 may supply audible responses to the voice input commands.

Haptic output devices 22 may include piezoelectric devices, electromagnetic actuators, and/or other actuators for generating haptic output. Haptic output devices 22 can produce motion that is sensed by the user (e.g., through the user's skin). Haptic output devices 22 may include actuators such as electromagnetic actuators, motors, piezoelectric actuators, electroactive polymer actuators, vibrators, linear actuators, rotational actuators, actuators that bend bendable members, shape memory materials, actuator devices that create and/or control repulsive and/or attractive forces between devices 10 and/or 40 (e.g., components for creating electrostatic repulsion and/or attraction such as electrodes, components for producing ultrasonic output such as ultrasonic transducers, components for producing magnetic interactions such as electromagnets for producing direct-current and/or alternating-current magnetic fields, permanent magnets, magnetic materials such as iron or ferrite, and/or other circuitry for producing repulsive and/or attractive forces between devices 10 and/or 40). In some situations, actuators for creating forces in device 10 may be used in producing tactile output on the user's skin. For example, haptic output devices 22 may tighten or otherwise adjust the shape of the string-like device to provide haptic feedback to a user. In other situations, these components may be used to interact with each other (e.g., by creating a dynamically adjustable electromagnetic repulsion and/or attraction force between a pair of devices 10 and/or between device(s) 10 and device(s) 40 using electromagnets).

In one illustrative arrangement, haptic output devices 22 include piezoelectric actuators formed from piezoelectric fibers in fabric 36. For example, fabric 36 may be a nonwoven fabric that contains polyvinylidene fluoride (PVDF) fibers that have been aligned to exhibit piezoelectricity. The fibers may be deposited using a hollow cylindrical near-field electrospinning process or other process. This type of fabric, sometimes referred to as PVDF nonwoven fiber fabric, may be used as an energy harvester, an electromechanical actuator, and/or a pressure sensor. If desired, control circuitry 12 may provide haptic output or may change the shape of device 10 using PVDF nonwoven fabric.

If desired, haptic output devices 22 may include magnetic structures such as magnetic linkages that furl and unfurl under an appropriate electromagnetic field. This type of haptic output device may be used to provide haptic output to a user and/or to change the shape of device 10.

Device 10 may include one or more energy storage devices 24. Energy storage devices 24 may include batteries and capacitors. Capacitors for energy storage may be based on supercapacitor structures. Devices 24 may, for example, include super capacitor(s) such as electrostatic double-layer capacitors. Electrostatic double-layer capacitors (sometimes referred to as electrostatic double-layer supercapacitors) are electrochemical capacitors in which energy is stored in a capacitor formed from relatively large electrodes that are bathed in electrolyte and separated by a small distance, allowing the capacitor to achieve high energy storage capacities.

Energy storage device 24 may be charged via a wired connection or, if desired, device 10 may charge energy storage device 24 using wirelessly received power. Power may be received wirelessly using wireless power receiving circuitry 32. Wireless power receiving circuitry 32 in device 10 may receive power from wireless power transmitting circuitry. The wireless power transmitting circuitry may be located in device 40 or other electronic device. The wireless power transmitting circuitry may transmit power wirelessly using inductive wireless power transfer, using capacitive wireless power transfer, and/or other wireless power transfer configurations (e.g., optical).

With one illustrative configuration, wireless power receiving circuitry 32 may include, for example, inductive charging components such as coil 34 and a corresponding rectifier circuit or other wireless power receiving circuit for converting wirelessly received power from coil 34 into direct-current power for powering device 10 and charging energy storage device 24.

As another example, wireless power receiving circuitry 32 may be configured to convert radio-frequency energy received by antenna 28 from a radio-frequency transmitter into direct-current power for powering device 10 and charging battery 24. The radio-frequency transmitter may be located in device 40 or other electronic device and may, if desired, be located a given distance away from device 10 (e.g., the radio-frequency transmitter need not be directly near to device 10 for receiving circuitry 32 to be able to convert the radio-frequency energy into direct-current power).

If desired, ambient light can be converted into direct-current power for device 10 using photovoltaic device (solar cells). Energy can also be harvested from movements of the user of device 10 (e.g., using a piezoelectric energy harvesting device or other energy harvesting circuitry).

Control circuitry 12 may use communications circuitry 26 to transmit data to external equipment and to receive data from external equipment. Communications circuitry 26 may include wireless communication circuitry such as one or more antennas such as antenna 28 and associated radio-frequency transceiver circuitry 30. Transceiver circuitry 30 may include wireless local area network transceiver circuitry (e.g., WiFi® circuitry), Bluetooth® circuitry, cellular telephone transceiver circuitry, ultra-wideband communications transceiver circuitry, millimeter wave transceiver circuitry, near-field communications circuitry, satellite navigation system circuitry such as Global Positioning System (GPS) receiver circuitry (e.g., for receiving GPS signals at 1575 MHz or for handling other satellite positioning data), and/or wireless circuitry that transmits and/or receives signals using light (e.g., with light-emitting diodes, lasers, or other light sources and corresponding light detectors such as photodetectors). Antennas 28 may include monopole antennas, dipole antennas, patch antennas, inverted-F antennas, loop antennas, slot antennas, other antennas, and/or antennas that include antenna resonating elements of more than one type (e.g., hybrid slot-inverted-F antennas, etc.). Antennas 28 may be formed from metal traces on printed circuits or other substrates, may include stamped metal parts, may include metal structures that form part of an enclosure or other supporting structure for device 10, may include wires and other conductive strands of material in fabric 36, and/or other conductive structures.

Device 10 may use communications circuitry 26 to communicate directly with device 40, to communicate with a server, and/or to communicate with other devices 10 in system 8. If desired, multiple devices 10 may be used to form nodes in a mesh network. In this type of scenario, a given device 10 may communicate with device 40 and/or other devices 10 by routing signals through a mesh network of intermediary devices 10.

Device 10 may include intertwined strands of material that form fabric such as fabric 36. Fabric 36 may, if desired, be stretchable fabric (e.g., elastic fabric formed using stretchable strands of material). Items such as device 10 may therefore sometimes be referred to as fabric-based items, stretchable-fabric items, stretchable-fabric-based electronic devices, etc. In some configurations, stretchable fabric for device 10 may form a stretchable cord (e.g., a stretchable string) or a stretchable band (e.g., a wristband, headband, armband, waistband, other stretchable band in an item of clothing, or a stretchable band that is not used as an item of clothing). Fabric 36 of device 10 may be soft (e.g., fabric 36 may yield to a light touch), may have a rigid feel (e.g., fabric 36 may be a stiff fabric), may be coarse, may be smooth, may have ribs or other patterned textures, and/or may be formed as part of a device that has portions formed from non-fabric structures of plastic, metal, glass, crystalline materials, ceramics, or other materials.

Yarns for fabric 36 may be formed from polymer, metal, glass, graphite, ceramic, natural materials as cotton or bamboo, or other organic and/or inorganic materials and combinations of these materials. Conductive coatings such as metal coatings may be formed on non-conductive material. For example, plastic yarns and monofilaments may be coated with metal to make them conductive. Reflective coatings such as metal coatings may be applied to make yarns and monofilaments reflective. Yarns may be formed from a bundle of bare metal wires or metal wire intertwined with insulating monofilaments (as examples). Strands of fabric 36 may have the same color or there may be strands of two or more different colors in fabric 36, if desired.

Strands of material may be intertwined to form fabric 36 using intertwining equipment such as weaving equipment, knitting equipment, or braiding equipment. Intertwined strands may, for example, form woven fabric, knit fabric, braided fabric, etc. Conductive strands and insulating strands may be woven, knit, braided, or otherwise intertwined to form contact pads that can be electrically coupled to conductive structures in item 10 such as the contact pads of an electrical component. The contacts of an electrical component may also be directly coupled to an exposed metal segment along the length of a conductive yarn or monofilament.

Conductive and insulating strands may also be woven, knit, or otherwise intertwined to form conductive paths. The conductive paths may be used in forming signal paths (e.g., signal buses, power lines, etc.), may be used in forming antennas, may be used in forming part of a capacitive touch sensor electrode, a resistive touch sensor electrode, a force sensor electrode, or other input-output device, or may be used in forming other patterned conductive structures. Conductive structures in the fabric of item 10 may be used in carrying power signals, digital signals, analog signals, sensor signals, control signals, data, input signals, output signals, radio-frequency signals such as antenna signals, or other suitable electrical signals.

Device 10 may include mechanical structures in addition to fabric 36 such as polymer binder to hold strands in fabric 36 together, support structures such as frame members, housing structures (e.g., an electronic device housing), and other mechanical structures.

Electronic device 40 of system 8 may include control circuitry 42. Control circuitry 42 may include storage and processing circuitry for supporting the operation of device 40 and/or system 8. The storage and processing circuitry may include storage such as nonvolatile memory (e.g., flash memory or other electrically-programmable-read-only memory configured to form a solid state drive), volatile memory (e.g., static or dynamic random-access-memory), etc. Processing circuitry in control circuitry 42 may be used to gather input from sensors and other input devices and may be used to control output devices. The processing circuitry may be based on one or more microprocessors, microcontrollers, digital signal processors, baseband processors and other wireless communications circuits, power management units, audio chips, application specific integrated circuits, etc.

Electronic device 40 may include input-output devices 46. Input-output devices 46 may be used in gathering user input, in gathering information on the environment surrounding device 40, and/or in providing a user with output. Devices 46 may include sensors 48. Sensors 48 may include force sensors (e.g., strain gauges, capacitive force sensors, resistive force sensors, etc.), audio sensors such as microphones, touch and/or proximity sensors such as capacitive sensors, optical sensors such as optical sensors that emit and detect light, ultrasonic sensors, and/or other touch sensors and/or proximity sensors, monochromatic and color ambient light sensors, image sensors, sensors for detecting position, orientation, and/or motion (e.g., accelerometers, magnetic sensors such as compass sensors, gyroscopes, and/or inertial measurement units that contain some or all of these sensors), muscle activity sensors (EMG), radio-frequency sensors, depth sensors (e.g., structured light sensors and/or depth sensors based on stereo imaging devices), optical sensors such as self-mixing sensors and light detection and ranging (lidar) sensors that gather time-of-flight measurements, humidity sensors, moisture sensors, and/or other sensors. In some arrangements, device 40 may use sensors 48 and/or other input-output devices 46 to gather user input (e.g., buttons may be used to gather button press input, touch sensors overlapping displays can be used for gathering user touch screen input, touch pads may be used in gathering touch input, microphones may be used for gathering audio input, accelerometers may be used in monitoring when a finger contacts an input surface and may therefore be used to gather finger press input, etc.).

Device 40 may include haptic output devices 50. Haptic output devices 50 can produce motion that is sensed by the user (e.g., through the user's skin). Haptic output devices 50 may include actuators such as electromagnetic actuators, motors, piezoelectric actuators, electroactive polymer actuators, vibrators, linear actuators, rotational actuators, actuators that bend bendable members, actuator devices that create and/or control repulsive and/or attractive forces between devices 10 and/or 40 (e.g., components for creating electrostatic repulsion and/or attraction such as electrodes, components for producing ultrasonic output such as ultrasonic transducers, components for producing magnetic interactions such as electromagnets for producing direct-current and/or alternating-current magnetic fields, permanent magnets, magnetic materials such as iron or ferrite, and/or other circuitry for producing repulsive and/or attractive forces between devices 10 and/or 40). In some situations, actuators for creating forces in device 40 may be used in producing tactile output on the user's skin. In other situations, these components may be used to interact with each other (e.g., by creating a dynamically adjustable electromagnetic repulsion and/or attraction force between a pair of devices 40 and/or between device(s) 10 and device(s) 40 using electromagnets).

If desired, input-output devices 46 of device 40 may include other devices 52 such as displays (e.g., to display images for a user), status indicator lights (e.g., a light-emitting diode that serves as a power indicator, and other light-based output devices), speakers and other audio output devices, electromagnets, permanent magnets, structures formed from magnetic material (e.g., iron bars or other ferromagnetic members that are attracted to magnets such as electromagnets and/or permanent magnets), batteries, etc. Device 40 may also include power transmitting and/or receiving circuits configured to transmit and/or receive wired and/or wireless power signals.

To support communications between devices 10 and 40 and/or to support communications between equipment in system 8 and external electronic equipment, control circuitry 42 may communicate using communications circuitry 44. Circuitry 44 may include antennas, radio-frequency transceiver circuitry, and other wireless communications circuitry and/or wired communications circuitry. Circuitry 44, which may sometimes be referred to as control circuitry and/or control and communications circuitry, may, for example, support bidirectional wireless communications between devices 10 and 40 over wireless link 38 (e.g., a wireless local area network link, a near-field communications link, or other suitable wired or wireless communications link (e.g., a Bluetooth® link, a WiFi® link, a 60 GHz link or other millimeter wave link, an ultra-wideband communications link, etc.). Device 40 may also include power circuits for transmitting and/or receiving wired and/or wireless power and may include batteries. In configurations in which wireless power transfer is supported between devices 10 and 40, in-band wireless communications may be supported using inductive power transfer coils (as an example).

Wireless signals 38 may be used to convey information such as location and orientation information. For example, control circuitry 42 in device 40 may determine the location of device 10 using wireless signals 38 and/or control circuitry 12 in device 10 may determine the location of device 40 using wireless signals 38.

In one illustrative arrangement, device 10 may include a low-power transmitter (e.g., an radio-frequency identification transmitter or other transmitter). Device 40 may have a corresponding receiver that detects the transmitted signals 38 from device 10 and determines the location of device 10 based on the received signals. In some arrangements, device 10 may not include an internal power source and may instead be powered by electromagnetic energy from device 40 or other device. In other arrangements, device 10 may include an internal power source.

Device 40 may track the location (e.g., the indoor or outdoor location) of device 10 using signal strength measurement schemes (e.g., measuring the signal strength of radio signals from device 10) or using time based measurement schemes such as time of flight measurement techniques, time difference of arrival measurement techniques, angle of arrival measurement techniques, triangulation methods, time-of-flight methods, using a crowdsourced location database, and other suitable measurement techniques. This type of location tracking may be achieved using ultra-wideband signals, Bluetooth® signals, WiFi® signals, millimeter wave signals, or other suitable signals. This is merely illustrative, however. If desired, control circuitry 42 of device 10 may determine the distance to device 10 using Global Positioning System receiver circuitry, using proximity sensors (e.g., infrared proximity sensors or other proximity sensors), depth sensors (e.g., structured light depth sensors that emit beams of light in a grid, a random dot array, or other pattern, and that have image sensors that generate depth maps based on the resulting spots of light produced on target objects), sensors that gather three-dimensional depth information using a pair of stereoscopic image sensors, lidar (light detection and ranging) sensors, radar sensors, using image data from a camera, using motion sensor data, and/or using other circuitry in device 40.

If desired, angle of arrival measurement techniques may be employed by control circuitry 12 of device 10 and/or control circuitry 42 of device 40 to determine the relative orientation of device 10 and device 40. For example, control circuitry 42 may determine the orientation of device 40 relative to device 10 by determining a phase difference associated with signals 38 received by antennas in device 40. The phase difference may be used to determine an angle of arrival of signals 38 received by device 40. Similarly, control circuitry 12 of device 10 may, if desired, determine the orientation of device 10 relative to device 40 by determining a phase difference associated with signals 38 received by antennas 28 in device 10. The phase difference may be used to determine an angle of arrival of signals 38 received by device 10.

In some arrangements, one or more devices 10 may serve as an anchor or visual marker in a virtual reality or augmented reality system. When device 10 is used as an anchor, device 40 may map out an environment (or may receive and/or store information about a previously mapped out environment) using a virtual coordinate system that is anchored by device 40. Device 40 may determine the location of other objects (e.g., other devices 10) based on the location of anchored device 10.

In arrangements where device 10 is used as a visual marker, device 10 may include one or more features (e.g., physical surfaces features, infrared-reflective ink features, visible ink features, etc.) that may be detected by a camera in device 40 (e.g., an infrared camera, a visible light camera, or other suitable camera). The markers on device 10 may help inform system 8 of a location a virtual work surface and/or the location of a user's hands or other bod party as the user is interacting with a computer or other equipment in system 8.

In some arrangements, devices 10 may be distributed at museums or events to provide guests with assistance. For example, devices 10 may be distributed with a pair of wireless headphones at a museum. Device 10 may store information about objects at the museum and may wirelessly transmit audio signals to the headphones to provide the user with audio describing the objects at the museum. Devices 10 may be used at events to give guests access to certain locations or content. These examples are merely illustrative. Devices 10 may be used for other purposes, if desired.

Figure 2:
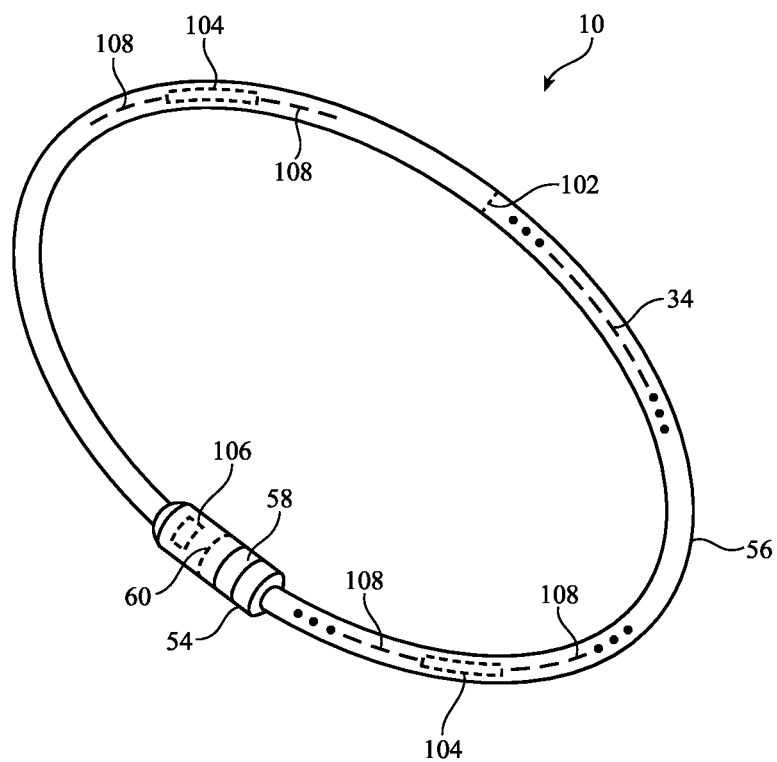
FIG. 2 is a perspective view of an illustrative loop-shaped wearable electronic device having a fabric cord and a housing unit in accordance with an embodiment.

FIG. 2 is a perspective view of an illustrative electronic device 10. Device 10 of FIG. 2 may include components such as main housing unit 54 and/or cord 56. Cord 56 and/or main unit 54 may each be configured to operate as a stand-alone unit, if desired. Illustrative configurations for device 10 in which device 10 includes cord 56 (e.g., a removable strap for main unit 54, a strap that is integrated with main unit 54, a stand-alone cord without an associated main unit 54, etc.) may sometimes be described herein as examples. In general, device 10 may include any suitable structures (e.g., different types of wearable housings, etc.) that incorporate circuitry of the type shown in FIG. 1. Cord 56, which may sometimes be referred to as a band or string, may be coupled to main unit 54 using magnets, pins, a tongue-and-groove configuration, using housing slits or other openings that receive cord 56, and/or other configurations in which cord 56 is attached to main unit 54.

Main housing unit 54, which may sometimes be referred to as a case or housing capsule, may be formed from metal, polymer, ceramic, glass, silicone, leather, fabric, other suitable materials, or a combination of these materials. Main housing unit 54 may have any suitable shape. As examples, main housing unit 54 may have a circular cross-sectional shape, a rectangular cross-sectional shape, a rectangular cross-sectional shape with rounded corners, an oval cross-sectional shape, or other suitable cross-sectional shape. Main housing unit 54 and/or cord 56 may be formed using molding (e.g., injection molding, insert molding, overmolding, compression molding, etc.), machining, stretching, bending, casting, other fabrication techniques, or a combination of these fabrication techniques.

If desired, one or more portions of device 10 may be formed from fabric (e.g., fabric 36 of FIG. 1). For example, cord 56 may be a cord of fabric or may include a cord of fabric (e.g., stretchable or non-stretchable fabric). Cord 56 of device 10 of FIG. 2 is formed from a ring-shaped strip or cord of stretchable fabric having an opening that is configured to receive an object and/or a body part of a user. The loop shape of device 10 of FIG. 2 allows device 10 to be worn on a body part of a user (e.g., a user's head, arm, wrist, waist, leg, ankle, finger, neck, torso, etc.). If desired, device 10 may be formed using stretchable fabric that returns to its original shape after being stretched. The use of stretchable fabric in device 10 may ensure that device 10 is held against the user's body so that sensors (e.g., sensor electrodes) will be in close proximity to the user's skin and can gather measurements that might otherwise be difficult or impossible to gather (e.g., skin moisture measurements, EKG measurements, blood pressure measurements, etc.). This is, however, merely illustrative. If desired, device 10 may be formed using fabric that is not stretchable or may be formed without fabric.

Cord 56 may have any suitable shape. As examples, cord 56 may have a circular cross-sectional shape, a rectangular cross-sectional shape, a rectangular cross-sectional shape with rounded corners, an oval cross-sectional shape, or other suitable cross-sectional shape. Cord 56 may have curved outer surfaces, may have planar outer surface, may be flat, or may have a combination of these shapes.

Cord 56 may be a single unitary cord (e.g., a continuous loop or a string having ends that attach to respective edges of main unit 54 and/or that attach to each other) or may be formed from first and second portions that can be joined by clasp 102 (e.g., a magnetic clasp, an electrical clasp, a mechanical clasp, etc.). If desired, device 10 may also or instead include a clasp in main unit 54 such as clasp 60 (e.g., a magnetic clasp, an electrical clasp, a mechanical clasp, etc.).

Cord 56 may be formed from elastomeric polymer (e.g., silicone and/or other stretchable plastics), may be formed from metal (e.g., metal links, interlinked chain links, etc.), may be formed from fabric (e.g., fabric 36 such as knit fabric, woven fabric, and/or braided fabric, fabric that includes stretchable strands of elastomeric material, etc.), may be formed from other materials (e.g., leather, wood, or other natural materials, ceramic, crystalline materials, etc.), and/or may be formed from a combination of these materials. Configurations in which cord 56 is formed from elastomeric polymer materials may sometimes be described herein as an example. This is, however, merely illustrative. Cord 56 may, in general, be formed from any suitable materials. Arrangements in which cord 56 and/or housing unit 54 include waterproof materials, water-resistant materials, and/or oil-resistant materials may also be used.

Clasp 102 and/or clasp 60 may be formed from any suitable clasp structure. If desired, clasp 102 and/or clasp 60 may be magnetic clasps (e.g., magnetic twist clasps). With this type of arrangement, portions of device 10 on opposing sides of clasp 102 and/or clasp 60 may be magnetically attracted to each other and may therefore close clasp 102 and/or clasp 60. Device 10 may be pulled open at clasp 102 and/or clasp 60 (e.g., by applying sufficient force to overcome the magnetic attraction between these portions) whenever a user desires to open device 10. When it is desired to close device 10 into a loop, the portions of device 10 on opposing sides of clasp 102 and/or clasp 60 may be brought into close proximity to each other, at which point the magnetic attraction between the two sides will pull them together and close the clasp.

Portions of cord 56 and/or main housing unit 54 may contain some or all of the circuitry of device 10 of FIG. 1. The circuitry of device 10 of FIG. 1 may be located entirely in cord 56, may be located entirely in main unit 54, or may be located partially in main unit 54 and partially in cord 56. As shown in FIG. 2, for example, main unit may include electrical components 106 and cord 56 may include electrical components 104. Components 106 and 104 may include any or all of the circuitry of device 10 of FIG. 1.

Figure 7:
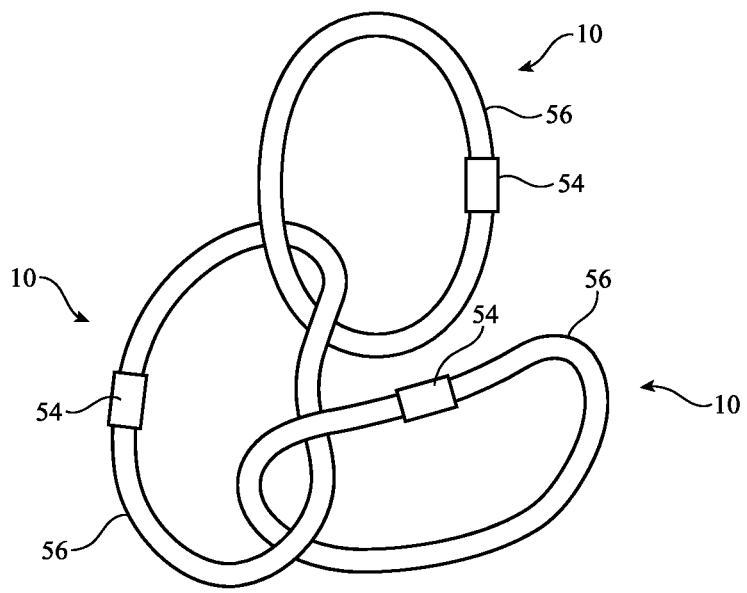
FIG. 7 is a perspective view of illustrative loop-shaped wearable electronic devices that are interlocked with one another in accordance with an embodiment.
Figure 8:
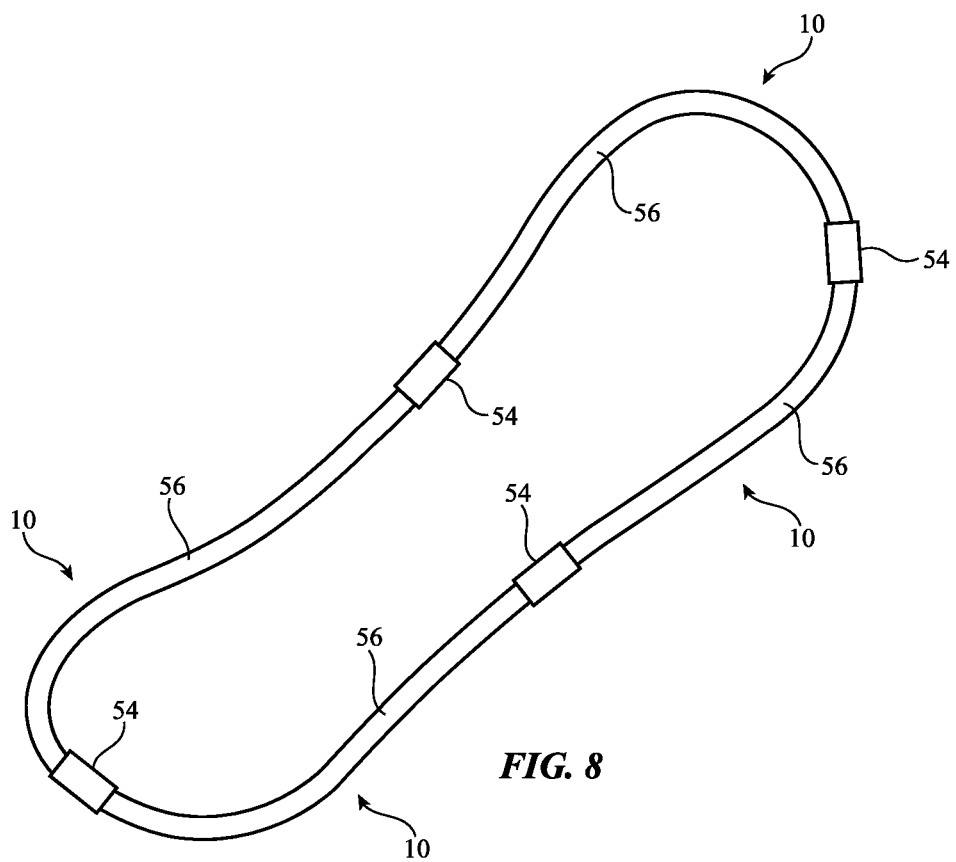
FIG. 8 is a perspective view of illustrative loop-shaped wearable electronic devices that have been connected end-to-end in accordance with an embodiment.

If desired, components 106 and/or components 108 may include sensors (e.g., sensors 20) that detect when clasp 102 and/or clasp 60 have been opened, that detect when device 10 is near other devices 10, that detect when device 10 is coupled to other devices (e.g., interlocked as shown in FIG. 7 or attached end-to-end as shown in FIG. 8), that detect when device 10 has been stretched, that detect when device 10 is hung on or looped through an object, that detect when device 10 is beckoned, that detect when cord 56 is in a knot (e.g., using a capacitive sensing coaxial cable arrangement), and/or that detect other status information about device 10 and its surroundings. Control circuitry 12 may take suitable action based on the gathered status information. For example, magnetic sensors in unit 54 and/or cord 56 may detect when the magnetic portions of clasp 102 and/or clasp 60 have been moved away from each other and control circuitry 12 may take appropriate action. As examples, control circuitry 12 may adjust a sleep/wake status of device 10, may issue a notification for a user of device 10, may send a signal to device 40 so that control circuitry 42 in device 40 may take appropriate action (e.g., by notifying a user of device 40 of the open/closed status of device 10 with visual output, haptic output, audio output, or other output), may adjust charging operations, and/or may take other actions.

As shown in FIG. 2, cord 56 may include conductive paths such as paths 108. Paths 108 may include one or more conductive lines for carrying power signals, data signals, control signals, and/or other signals. Paths 108 may be formed from conductive strands of material in fabric, metal traces on printed circuits, flexible substrates, or other substrates, conductive polymer (e.g., an elastomeric polymer with conductive filler such as carbon-loaded elastomeric polymer), metal traces deposited by physical vapor deposition and/or electrochemical deposition, metal foil, conductive polymer that is deposited on fabric, and/or other conductive patch structures. Paths 108 may be used for coupling components 104 to other components 104, for coupling components 104 to components 106 in main unit 54, and/or for other functions. If desired, conductive paths 108 may be used in forming an antenna such as antenna 28 of FIG. 1. Antenna(s) 28 may be coupled to wireless communications circuitry 26.

In arrangements where device 10 receives wireless power using inductive charging components, cord 56 may incorporate a coil such as coil 34. Coil 34 may be formed from one or more conductive lines that run around item 10 (e.g., ring-shaped cord 56 of item 10 may include conductive strands of material such as insulated and/or bare wire that form a wireless power receiving coil with one turn, at least two turns, at least three turns, at least 10 turns, fewer than 15 turns, fewer than 8 turns, or other suitable number of turns).

Devices such as device 10 of FIG. 2 may use input-output devices 14 in components 106 and 104 to gather any suitable input and provide any suitable output. As an example, device 10 may use motion sensor(s) such as accelerometers to gather motion data and analyze a user's activity (e.g., running, walking, cycling, stair climbing, hiking etc.), may use blood pressure sensors to gather blood pressure information, may use heart rate sensors to gather heart rate information, may include blood sugar sensors for gathering blood sugar levels, may use blood oxygen sensors to measure a user's blood oxygen level, may use location tracking circuitry to track a user's location (e.g., location relative to another electronic device such as electronic device 40 or geographic location such as geographic coordinates), etc. If desired, accelerometers and/or other sensors may gather information on a user's respiration rate (e.g., by extracting respiration rate information from accelerometer readings). Health data, intentional user input (e.g., button press input on force sensors, touch sensors, and/or other input devices, voice commands gathered with a microphone, gesture input, tap input, etc.), environmental readings, and/or other information on the user and the user's surroundings may be gathered by devices 14 and processed by control circuitry 12. Control circuitry 12 may also use the output devices of input-output devices 14 to provide haptic output, audio output, visual output (e.g., status light indicator output, display output such as displayed images of text, graphics, and/or video, etc.), and/or other output may be provided.

In some configurations, device 10 may be used in isolation (e.g., as a wrist band with input and output capabilities). In other configurations, device 10 may operate in conjunction with external equipment (e.g., device 40 of FIG. 1). As an example, device 10 may gather health data, location data, and/or other information using input-output devices 14 and may provide this information to device 40 wirelessly. Device 40 can process this data and can take suitable action (e.g., by using its input-output devices to provide output to a user or by directing device 10 to provide output to the user using the input-output circuitry 14 of device 10).

Components 106 and 104 may be located internally within device 10, may be located on the outer surfaces of device 10, and/or may be located within device 10 adjacent to the outer surfaces of device 10. For example, components 104 of cord 56 may be located within an outer fabric tube and/or may be located on the inner and/or outer surfaces of cord 56. Components 106 of main unit 54 may be located within an outer housing member and/or may be located on the inner and/or outer surfaces of unit 54. If desired, cord 56 and/or main unit 54 may include one or more openings through which electrical components transmit and/or receive signals.

As an example, components 106 may include light sources 16 (e.g., a pixel array, one or more light-emitting diodes, etc.) to form a light output region such as light output region 58 on main unit 54 of FIG. 2. Region 58 may be circular, oval, rectangular, and/or may have other shapes. Region 58 may be a single continuous area on unit 54 and/or may include multiple discrete areas. Region 58 of FIG. 2 extends continuously around the diameter of main unit 54, but regions such as region 58 may, if desired, extend only partway around the diameter of main unit 54, may extend radially or axially along unit 54, may be curved, may be flat, or may have other configurations. Region 58 may include input devices (e.g., components 18 and 20 of FIG. 1 such as touch sensors, buttons, force sensors, cameras, etc.) and may include output devices (e.g., haptic device 22 and light sources 16 of FIG. 1).

Light output region 58 may include status indicator lights (e.g., a light-emitting diode that serves as a power indicator, and other light-based output devices) and/or may include arrays (e.g., one-dimensional arrays or two-dimensional arrays) of pixels for forming displays such as liquid crystal displays, organic light-emitting diode displays, electrophoretic displays, displays formed from Janus particles, displays formed from crystalline semiconductor dies (microLEDs), etc. Light sources 16 in light output region 58 may be arranged in a circular pattern, a rectangular pattern (e.g., a rectangular array having rows and columns), may be arranged in a pattern with a coarse pitch (e.g., a pixel-to-pixel spacing of 0.1-1 mm, greater than 0.5 mm, less than 2 mm, etc.) to serve as a status indicator or a display with a relatively low resolution and/or may be arranged in a pattern with a fine pitch (e.g., a pixel-to-pixel spacing of 0.01 mm, less than 0.01 mm, 0.01-0.1 mm, more than 0.05 mm, etc.) to serve as a display that displays images. Light sources 16 in light output region 58 may include light-emitting diodes such as bare unpackaged crystalline semiconductor dies and/or packaged light-emitting diodes. Light sources 16 in light output region 58 may operate at infrared, ultraviolet, and/or visible light wavelengths. For example, light sources 16 may supply visible light such as red, green, blue light, white light, etc. Arrangements in which light sources 16 form a black and white display or status indicator may also be used. Light sources 16 may include a backlight (e.g., in a liquid crystal arrangement), may be self-emitting (e.g., in a light-emitting diode or organic light emitting diode arrangement), and/or may be passive (e.g., in a electrophoretic or Janus particle arrangement).

During operation, light sources 16 of light output region 58 may be used to provide a user of device 10 with visual output such as alerts (e.g., timer alerts, incoming message alerts, etc.), emojis, messages, text, graphics, images, moving images, flashing lights or lights of particular colors or patterns of colors that serve as status indicators (e.g., power level indicators, wireless signal strength indicators, hear beats per minute readouts, an ultraviolet light exposure indicator, etc.), and/or other suitable visual output. If desired, images, messages, or status information on light output region 58 may be displayed at a predetermined time, may be displayed in response to device 10 being opened or closed, and/or may be displayed in response to other input (e.g., input from sensors 20, input from a user through device 18, etc.). Status indicator light output on region 58 may be a solid illuminated region, may be faded in and out, may be pulsed, etc. If desired, images may move around the diameter of housing unit 54 or may remain in one place on housing unit 54.

Figure 3:
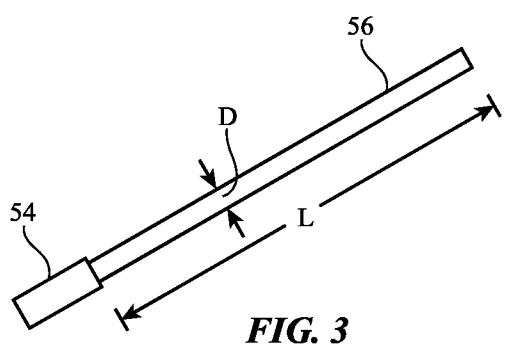
FIG. 3 is a perspective view of an illustrative loop-shaped wearable electronic device in an open state in accordance with an embodiment.

FIG. 3 shows device 10 in an "open" state in which one end of cord 56 is detached from main unit 54. If desired, both ends of cord 56 may be detached from unit 54. The diameter D of cord 56 may be between 2 mm and 10 mm, between 3 mm and 5 mm, between 3.5 mm and 4.5 mm, between 3 mm and 6 mm, greater than 10 mm, less than 10 mm, or any other suitable diameter or width. The length L of cord 56 may be between 150 mm and 210 mm, between 100 mm and 200 mm, between 50 mm and 300 mm, between 200 mm and 400 mm, greater than 200 mm, less than 200 mm, or any other suitable length.

A user of device 10 may place device 10 in a closed state (e.g., as shown in FIG. 2) or an open state (e.g., as shown in FIG. 3), by manipulating a clasp such as clasp 106 and/or 60 or by providing other suitable input (e.g., touch input, force input, button input, motion input, etc.). If desired, device 10 may be locked in a closed state such as the closed loop state of FIG. 2. The locking of device 10 may be an electronic or digital locking mechanism (e.g., in which control circuitry 12 renders the unlocking mechanism or other input device inactive until appropriate actions have taken place such as user authentication) or may be a mechanical or electromechanical locking mechanism. User authentication may be achieved through a touch sensor (e.g., by entering a passcode or other appropriate touch input), a motion sensor or camera that detects an appropriate gesture such as a hand wave sequence, a biometric sensor (e.g., that detects a user's fingerprint), a face identification sensor (e.g., an infrared camera that captures image of a user's face), or other suitable user authentication circuitry. Once a user's identity has been authenticated, control circuitry 12 may unlock device 10 and/or may take other suitable actions. If desired, different privileges may be assigned to different users such that control circuitry 12 may enable or disable certain functions depending on which user is using device 10.

If desired, control circuitry 12 may use haptic output devices 22 to change the shape of cord 56. This may include, for example, changing the shape of cord 56 from a furled shape as shown in FIG. 2 to an unfurled shape as shown in FIG. 3, or vice versa. In one illustrative arrangement, fabric 36 of cord 56 may be formed using piezoelectric fibers that are configured to change the shape of cord 56 from a furled shape as shown in FIG. 2 to an unfurled shape as shown in FIG. 3, or vice versa. In another illustrative arrangement, control circuitry 12 may change the shape of cord 56 using magnetic structures such as magnetic linkages that furl and unfurl under an appropriate electromagnetic field.

Figure 4:
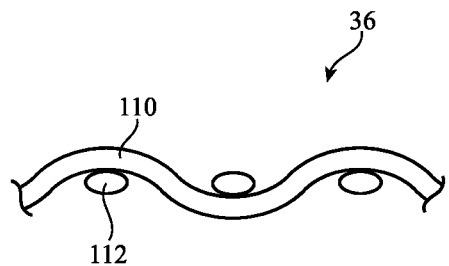
FIG. 4 is a cross-sectional side view of illustrative fabric that may be used in a loop-shaped wearable electronic device in accordance with an embodiment.

A cross-sectional side view of an illustrative layer of fabric for device 10 is shown in FIG. 4. As shown in FIG. 4, fabric 36 may be formed from intertwined strands of material such as strands 110 and strands 112. With one suitable arrangement, fabric 36 may be a woven fabric (e.g., strands 110 may be weft strands and strands 112 may be warp strands). Other arrangements may be used for intertwining strands of material for forming fabric 36 for device 10, if desired. In general, fabric 36 may be woven, knitted, braided, may be intertwined to form felt, or may contain strands of material that have been intertwined using other intertwining techniques. Fabric 36 may include one or more woven layers and/or one or more fabric layers formed from other intertwining techniques. If desired, layers of plastic and/or other materials may be coupled to one or more layers of fabric. In some arrangements, fabric 36 may include coatings (e.g., polymer coatings to prevent accumulation of dirt, materials that serve as moisture barrier layers, wear resistant coatings, transparent coatings such as patterned translucent coatings, etc.). These coating materials may penetrate into fabric 36 and/or may form layers on the inner and/or outer surfaces of fabric 36.

The strands of material that form fabric 36 may include insulating strands (e.g., polymer yarn, etc.) and conductive strands (e.g., bare wire and/or wire coated with insulation). The strands of material may be monofilaments, may be multifilament strands (sometimes referred to herein as yarns, threads, or multifilament wire), may be formed from metal (e.g., metal monofilaments and/or yarns formed from multiple monofilament wires), may be formed from dielectric (e.g., polymer monofilaments and yarns formed from multiple polymer monofilaments), may include dielectric cores covered with conductive coatings such as metal (e.g., metal coated dielectric monofilaments and yarns of metal coated polymer-core monofilaments may be used to form conductive monofilaments and conductive yarns, respectively), may include outer insulating coatings (e.g., coatings of polymers or other dielectrics may surround each metal-clad polymer monofilament or each collection of metal-clad polymer monofilaments in a yarn, polymer insulation may enclose a multifilament metal wire, etc.), or may be other suitable strands of material for forming fabric. Fabric 36 may be formed using monofilaments, multifilament strands of material (yarns), combinations of these arrangements (e.g., fabric with polymer coated wires interspersed with insulating yarn), etc. The diameter of strands 110 and 112 that are formed from yarns containing multiple monofilaments may be, for example, 0.25 mm, may be 0.1 to 0.5 mm, may be more than 0.2 mm, may be less than 2 mm, or may be any other suitable diameter (width).

In some arrangements, fabric 36 may include stretchable (elastic) strands of material. Strands 110 and/or 112 may, for example, be formed from an elastomeric polymer that can stretch and return elastically to its unstretched state (e.g., when strands 110 and 112 are not stretched more than their elongation-to-break limits). As an example, strands 110 and 112 may be formed from synthetic rubber or spandex (a copolymer of polyoxyethylene and polyurethane, sometimes referred to as Lycra® or elastane). Fabric 36 may instead or additionally have strands that are less stretchable, but that add strength to fabric 36. For example, strands 110 and/or strands 112 may be nylon strands or strands of other strong material. These examples are merely illustrative.

If desired, circuitry or other components of device 10 may be incorporated into strands 110 and/or strands 112. For example, strands 110 and/or strands 112 may be formed from fiber optic cables for transmitting optical signals, may contain Janus particles for forming a visual output region, may contain magnetic particles for forming a magnetic clasp or other structure, may contain haptic output devices 22 such as piezoelectric fibers or other piezoelectric materials, may form part of an antenna, may form part of an inductive charging coil, and/or may serve other functions.

Figure 5:
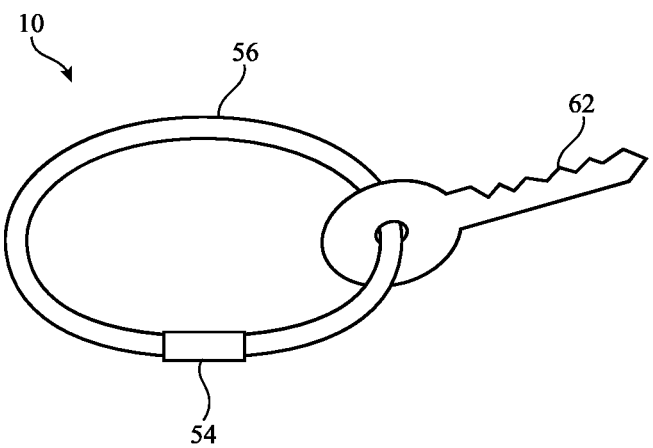
FIG. 5 is a perspective view of an illustrative loop-shaped wearable electronic device that has been inserted through an object such as a key in accordance with an embodiment.

Device 10 may be coupled to any suitable person, object, or animal. FIG. 5 shows how Device 10 may be threaded through or otherwise attached to an object such as object 62. Object 62 may be a key, a wallet, a suitcase, part of a child clothing, a dog or cat collar, a bicycle, a handbag, a shopping bag, an electronic device such as a pair of headphones, or any other suitable object. If desired, device 10 may be used as a tracking device to track the location of object 62. For example, device 10 may wirelessly communicate with device 40 of FIG. 1 to provide device 40 with information about the location of object 62. A user of device 40 may in turn use device 40 to communicate with device 10. For example, device 40 may instruct device 10 to provide output (e.g., audio output, visual output, haptic output, etc.) to help the user locate object 62. Location information may be gathered and transmitted to device 40 in real time or may be gathered and stored for later review by a user of device 10 and/or device 40.

Figure 6:
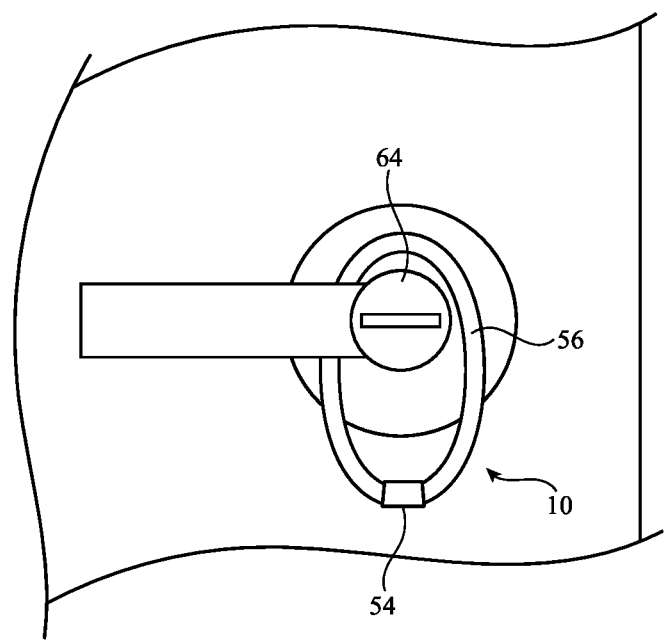
FIG. 6 is a perspective view of an illustrative loop-shaped wearable electronic device that has been hung on an object such as a door knob in accordance with an embodiment.

FIG. 6 shows how device 10 may be hung on an object such as object 64. Object 64 may be a door knob, a chair, a lamp, an electronic device such as a television, or any other suitable object. If desired, device 10 may be used as a spatial or status awareness device for obtaining information about its surroundings and/or about object 64 to which it is attached. For example, device 10 may use sensors (e.g., sensors 20) to detect what object 64 is, to detect what the status is of object 64 (e.g., open or closed status, locked or unlocked status, charging status, brightness status, etc.), to detect a characteristic of the environment around object 64 (e.g., temperature, brightness, humidity, number of people nearby, etc.), and/or to gather other information about object 64 and/or the environment around object 64.

FIG. 7 shows how multiple devices 10 may be interlocked with one another. In the example of FIG. 7, two devices 10 have been threaded through a third device 10. Other arrangements with multiple interlocking devices 10 may be used, if desired.

FIG. 8 shows how multiple devices 10 may be daisy-chained together to form a single loop with multiple cords 56 and multiple housing units 54. If desired, two, three, four, or more than four devices 10 may be strung together end-to-end to form a larger loop of any suitable size.

Interlocking devices 10 (FIG. 7) and connecting devices 10 end-to-end (FIG. 8) may enable certain types of communication between devices 10. For example, coupling devices 10 in this way may enable one device 10 to share charge with another device 10, may enable data to be transferred form one device 10 to another device 10, and/or may provide other communication capabilities between devices 10. Signals between devices 10 may be conveyed wirelessly or through electrical connections.

Figure 9:
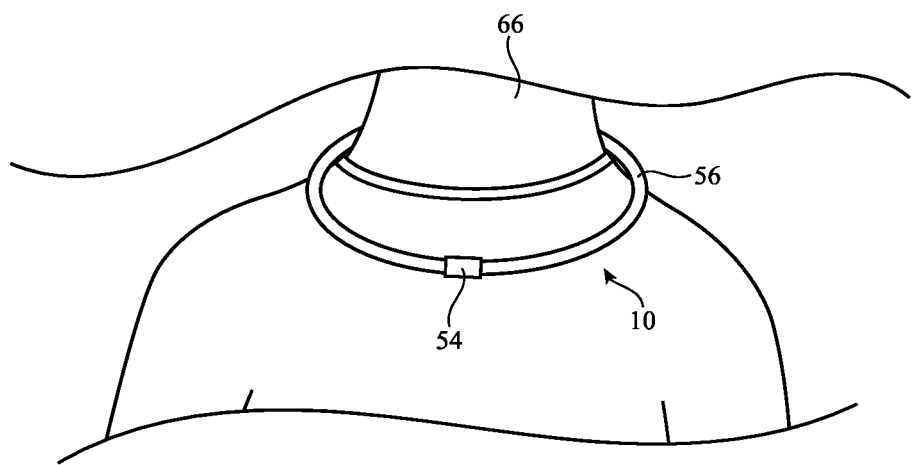
FIG. 9 is a perspective view of an illustrative loop-shaped wearable electronic device that is worn around a user's neck in accordance with an embodiment.

FIG. 9 shows how device 10 may be worn on a user's neck 66. If desired, multiple devices 10 may be daisy-chained together (e.g., as shown in the example of FIG. 8) to increase the length of the loop so that it fits around objects larger than a user's wrist.

Figure 10:
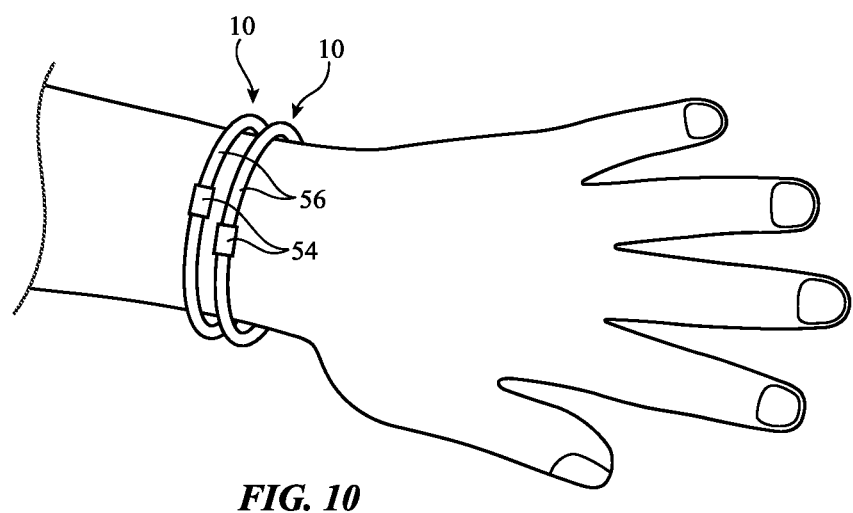
FIG. 10 is a perspective view of illustrative loop-shaped wearable electronic devices that are worn around a user's wrist in accordance with an embodiment.

FIG. 10 shows how a user may wear multiple devices 10. If desired, each device 10 may have different functionality than the other devices 10 (e.g., one device 10 may be geared towards fitness applications and another device 10 may be geared towards gaming applications), or devices 10 may have the same functionality.

FIGS. 11, 12, 13, 14, 15, and 16 show illustrative form factors that device 10 may have.

Figure 11:
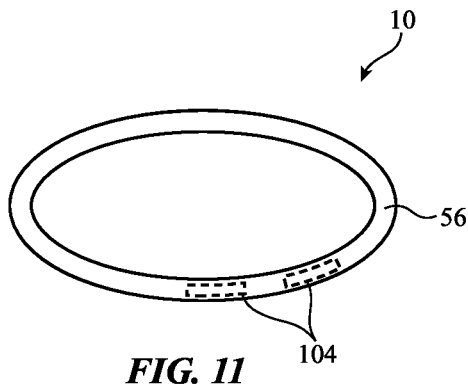
FIG. 11 is a perspective view of an illustrative loop-shaped wearable electronic device in which circuitry is embedded entirely in a fabric cord in accordance with an embodiment.

In the example of FIG. 11, device 10 is formed from a single cord 56 without a main housing unit 54. With this type of configuration, the circuitry of device 10 may be contained entirely within cord 56 (e.g., in components 104 of cord 56).

Figure 12:
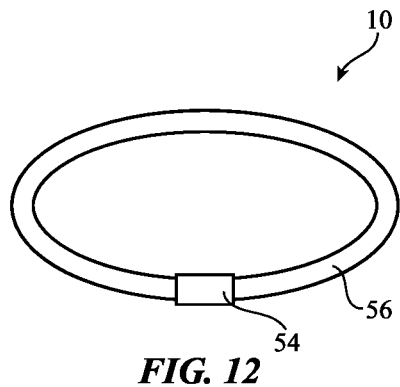
FIG. 12 is a perspective view of an illustrative loop-shaped wearable electronic device in which a fabric cord has two ends connected to a housing unit in accordance with an embodiment.

In the example of FIG. 12, device 10 includes main housing unit 54 and cord 56. Main housing unit 54 and cord 56 may form a continuous loop.

Figure 13:
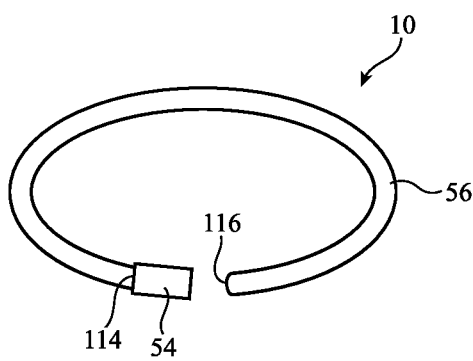
FIG. 13 is a perspective view of an illustrative loop-shaped wearable electronic device in which a fabric cord has one end connected to a housing unit and one end detached from the housing unit in accordance with an embodiment.

In the example of FIG. 13, device 10 includes main housing unit 54 coupled to one end (end 114) of cord 56. The opposing end of cord 56 (end 116) is not attached to housing unit 54. If desired, a clasp mechanism may be used to attach end 116 to housing 54 or end 116 may remain detached from housing 54.

Figure 14:
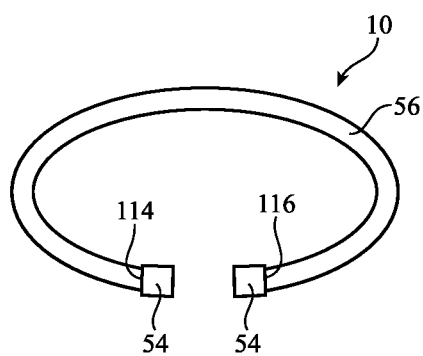
FIG. 14 is a perspective view of an illustrative loop-shaped wearable electronic device in which a fabric cord has two ends with a housing unit at each end in accordance with an embodiment.

In the example of FIG. 14, both opposing ends 114 and 116 of cord 56 are attached to a respective housing unit 54. Both housing units 54 may contain circuitry or circuitry may be contained only in one of housing units 54.

Figure 15:
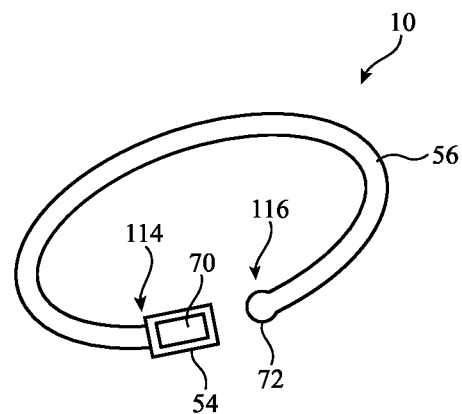
FIG. 15 is a perspective view of an illustrative loop-shaped wearable electronic device in which a fabric cord has two ends with one end attached to a housing unit and an opposing end with an engagement feature that mates with a corresponding engagement feature in the housing unit in accordance with an embodiment.
Figure 16:
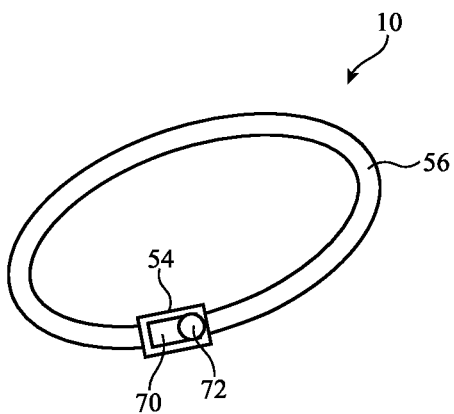
FIG. 16 is a perspective view of the loop-shaped wearable electronic device of FIG. 15 showing how a fabric cord may engage with a housing unit in accordance with an embodiment.

In the example of FIG. 15, device 10 has two opposing ends that can be interlocked or otherwise attached. For example, housing unit 54 on end 114 of cord 56 may have one or more engagement features such as engagement feature 70 and end 116 of cord 56 may have a corresponding engagement feature 72. Engagement feature 70 may be a hole, recess, or other feature configured to receive corresponding engagement feature 72 (e.g., a protrusion, spring-loaded pin, or other engagement feature). As shown in FIG. 16, engagement feature 70 of housing 54 may receive engagement feature 72 of cord 56. This is, however, merely illustrative. If desired, cord 56 may have a recess or hole and housing unit 54 may have a protruding structure that protrudes into the recess or hole.

Figure 17:
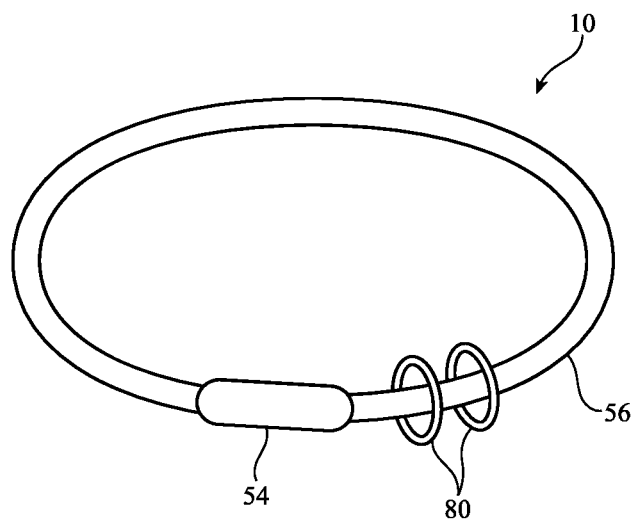
FIG. 17 is a perspective view of an illustrative loop-shaped wearable electronic device having a fabric cord that is inserted through openings in add-on structures in accordance with an embodiment.

FIG. 17 shows how separate add-on structures 80 may be strung onto cord 56 of device 10. Add-on structures 80 may be free of electronics (e.g., may serve a decorative, cosmetic, or tactile purpose) or add-on structures 80 may contain electronics. For example, add-on structures 80 may include displays, sensors, location tracking circuitry such as global positioning system receiver circuitry, medical monitoring circuitry, or other suitable circuitry. If desired, each individual add-on structure 80 may have a different functionality, and the user may select which functionality to add to device 10 by selecting the appropriate add-on structure 80. In the example of FIG. 17, add-on structures 80 have a ring-shape with a central opening that allows structures 80 to be strung onto device 10 by inserting cord 56 through the opening of structures 80. This is, however, merely illustrative. If desired, structures 80 may have other suitable shapes. Device 10 may wirelessly communicate with add-on structures 80 and/or add-on structures 80 may wirelessly communicate with device 40.

Figure 18:
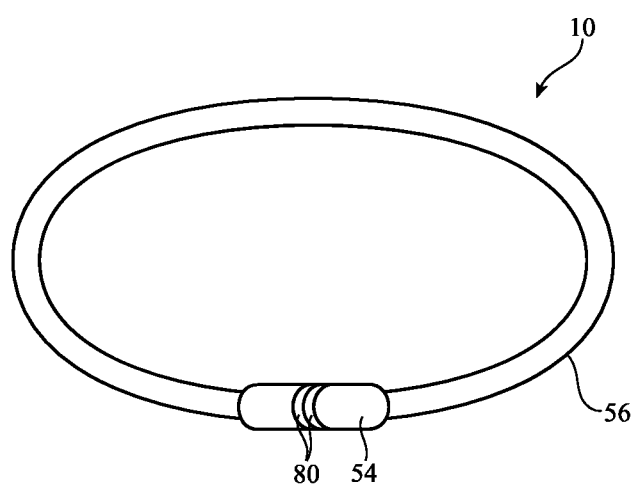
FIG. 18 is a perspective view of an illustrative loop-shaped wearable electronic device having add-on structures inserted between portions of a housing unit in accordance with an embodiment.

The example of FIG. 17 in which add-on structures are strung onto cord 56 such that cord 56 and add-on structures 80 are concentric is merely illustrative. In the example of FIG. 18, add-on structures 80 are added in-line with housing unit 54. The attachment mechanism between add-on structures 80 and housing unit 54 may be based on magnetic structures, mechanical structures, electrical structures, or other suitable attachment structures.

Figure 19:
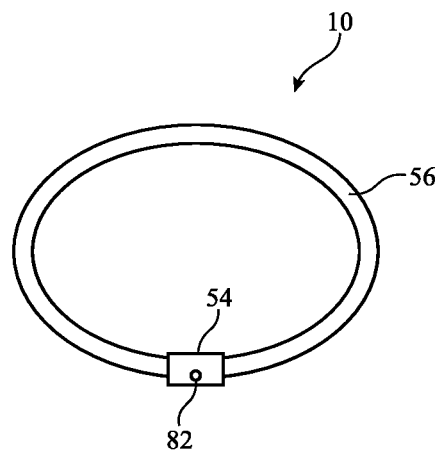
FIG. 19 is a perspective view of an illustrative loop-shaped wearable electronic device having a housing unit with a status indicator in accordance with an embodiment.

FIGS. 19, 20, 21, and 22 show illustrative arrangements for visual output on main housing unit 54 of device 10. In the example of FIG. 19, main housing unit 54 includes a status indicator 82. Status indicator 82 may be formed from one or more light-emitting diodes, one or more liquid crystal structures, one or more electrophoretic structures, Janus particles, or other visual output structures.

Figure 20:
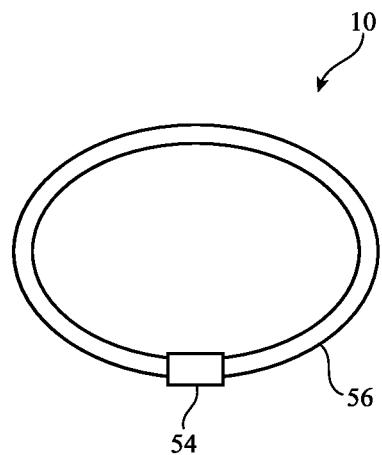
FIG. 20 is a perspective view of an illustrative loop-shaped wearable electronic device having a housing unit without a display or status indicator in accordance with an embodiment.

In the example of FIG. 20, main housing unit 54 is free of visual output structures such as displays and status indicators. If desired, main housing unit 54 may provide non-visual output such as haptic output, audio output, or other suitable output.

Figure 21:
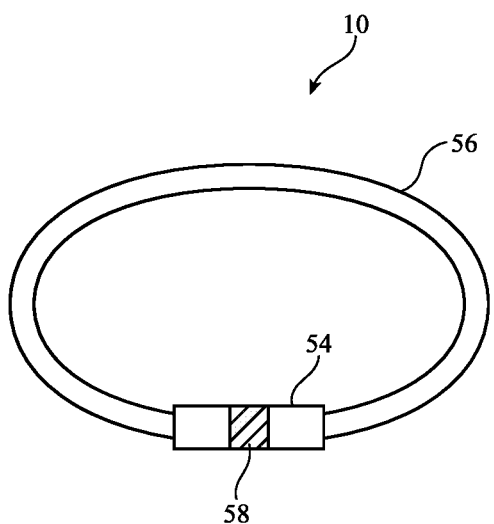
FIG. 21 is a perspective view of an illustrative loop-shaped wearable electronic device having a housing unit with a display that covers a portion of the housing unit in accordance with an embodiment.

In the example of FIG. 21, main housing unit 54 has visual output region 58 extending across only a portion of main housing unit 54. Visual output region 58 may contain an array of pixels (e.g., light-emitting diode pixels, organic light-emitting diode pixels, electrophoretic pixels, pixels based on Janus particles, etc.).

Figure 22:
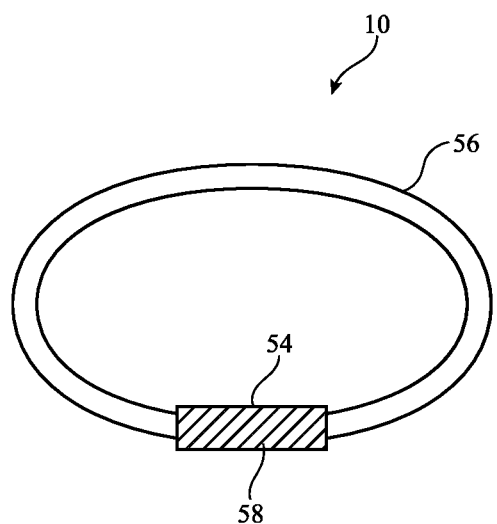
FIG. 22 is a perspective view of an illustrative loop-shaped wearable electronic device having a housing unit with a display that covers all of the housing unit in accordance with an embodiment.

In the example of FIG. 22, visual output region 58 covers most or all of the outer surface of main housing unit 54. This gives the appearance of a boundary-less display on main housing unit 54 of device 10.

Figure 23:
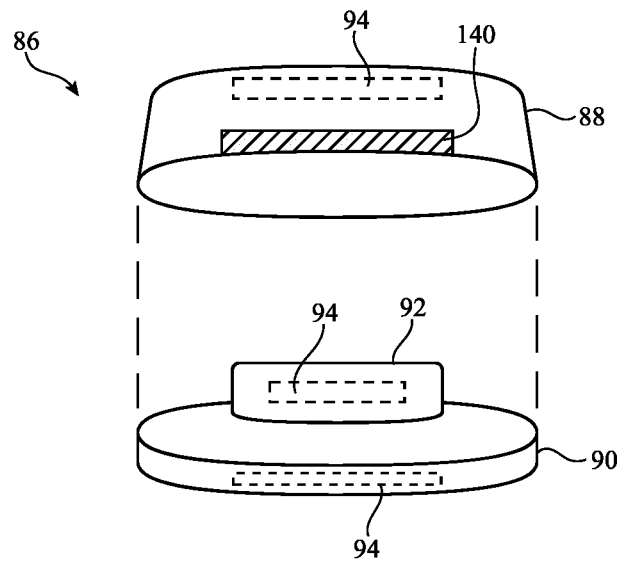
FIG. 23 is a perspective view of an illustrative charging case that may be used to charge loop-shaped wearable electronic devices in accordance with an embodiment.

FIGS. 23, 24, 25, and 26 show an illustrative case for devices 10. As shown in FIG. 23, case 86 may include upper housing member 88, lower housing member 90, and column 92 extending from lower housing member 90. Column 92 may be configured to receive devices 10. For example, devices 10 may be placed onto column 92 such that column 92 passes through the loops formed by devices 10 (e.g., such that devices 10 wrap around column 92). Case 86 may be formed from metal, polymer, ceramic, glass, silicone, other materials, or a combination of these materials.

If desired, case 86 may be free of electronics or case 86 may contain circuitry such as circuitry 94. Circuitry 94 may include some or all of the circuitry of device 40 of FIG. 1. For example, circuitry 94 may include a battery and/or wireless power transmitting circuitry that supplies wireless power signals that are received by wireless power receiving circuitry 32 in device 10. Wireless power transmitting circuitry 94 may transmit power wirelessly using inductive wireless power transfer, using capacitive wireless power transfer, and/or other wireless power transfer configurations (e.g., optical). With one illustrative configuration, wireless power receiving circuitry 32 in device 10 includes a wireless power receiving circuit having a coil (e.g., coil 34) and associated circuitry (e.g., one or more capacitors) and includes a rectifier that converts received alternating-current power signals from the wireless power receiving circuit to direct-current power for powering device 10. In this type of configuration, wireless power transmitting circuitry 94 may include inverter circuitry that is used to supply alternating-current (AC) signals (e.g., alternating-current signals controlled via pulse-width modulation) to a wireless power transmitting circuit that includes one or more coils and one or more associated capacitors. During operation, the signals supplied by the inverter circuitry cause the coil(s) in the wireless power transmitting circuit to emit wireless power signals, which are received and converted to direct-current (DC) power by circuitry 32. This is, however, merely illustrative. If desired, case 86 may charge devices 10 using an electrical connection.

Case 86 may include one or more visual output regions such as visual output region 140. Visual output region 140 may include status indicator lights (e.g., a light-emitting diode that serves as a power indicator, and other light-based output devices) and/or may include arrays (e.g., one-dimensional arrays or two-dimensional arrays) of pixels for forming displays such as liquid crystal displays, organic light-emitting diode displays, electrophoretic displays, displays formed from Janus particles, displays formed from crystalline semiconductor dies (microLEDs), etc. Light sources in light output region 140 may be arranged in a circular pattern, a rectangular pattern (e.g., a rectangular array having rows and columns), may be arranged in a pattern with a coarse pitch (e.g., a pixel-to-pixel spacing of 0.1-1 mm, greater than 0.5 mm, less than 2 mm, etc.) to serve as a status indicator or a display with a relatively low resolution and/or may be arranged in a pattern with a fine pitch (e.g., a pixel-to-pixel spacing of 0.01 mm, less than 0.01 mm, 0.01-0.1 mm, more than 0.05 mm, etc.) to serve as a display that displays images. Light sources in light output region 140 may include light-emitting diodes such as bare unpackaged crystalline semiconductor dies and/or packaged light-emitting diodes. Light sources in light output region 140 may operate at infrared, ultraviolet, and/or visible light wavelengths. For example, light output region 140 may supply visible light such as red, green, blue light, white light, etc. Arrangements in which light output region 140 is a black and white display or status indicator may also be used. Light output region 140 may include a backlight (e.g., in a liquid crystal arrangement), may be self-emitting (e.g., in a light-emitting diode or organic light emitting diode arrangement), and/or may be passive (e.g., in a electrophoretic or Janus particle arrangement).

If desired, circuitry 94 may include other circuitry such as communications circuitry and one or more speakers and microphones to serve as a virtual assistant for a user of device 10 and case 86. Circuitry 94 may be located in base portion 90, column 92, and/or in upper portion 88 of case 86.

Upper portion 88 and lower portion 90 may close using any suitable closure mechanism (e.g., a snap fit, a twist closure, a screw closure, a flexible closure, etc.).

Figure 24:
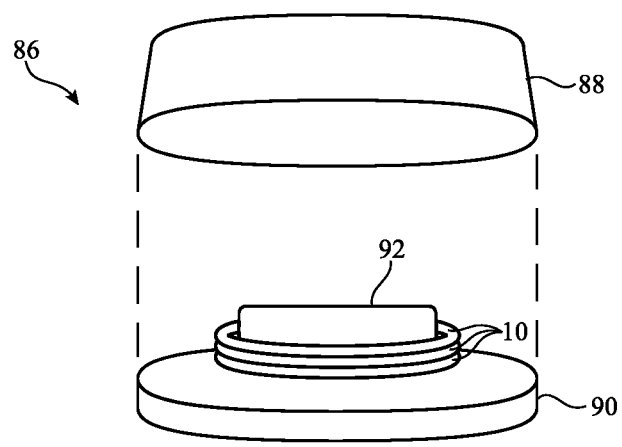
FIG. 24 is a perspective view of an illustrative charging case having a column on which loop-shaped wearable electronic devices have been placed in accordance with an embodiment.

FIG. 24 shows how multiple devices 10 may be stored in case 86, if desired. Case 86 may be configured to charge all devices 10 (e.g., in sequence, at the same time, etc.) when placed on column 92.

Figure 25:
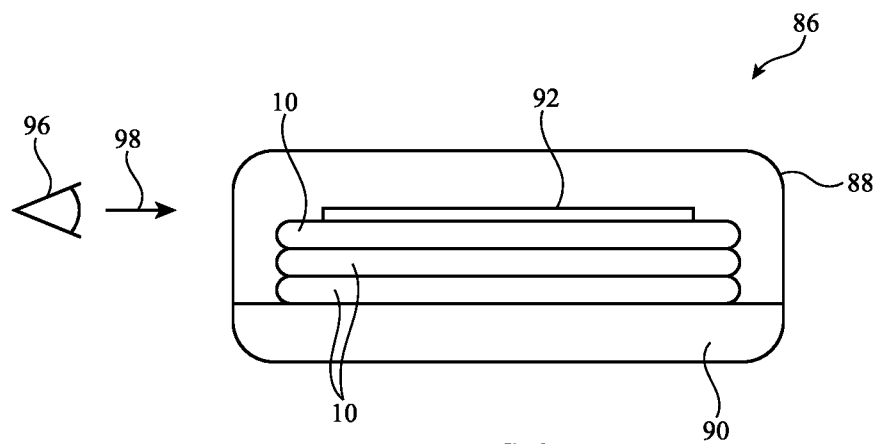
FIG. 25 is a side view of an illustrative charging case having a transparent portion in accordance with an embodiment.

FIG. 25 shows an example in which case 86 has one or more transparent portions. For example, upper portion 88 of case 86 may be transparent. This allows a viewer such as viewer 96 viewing case 86 in direction 98 to see through case 86 and easily discern whether device(s) 10 are present in case 86 without having to open case 86.

Figure 26:
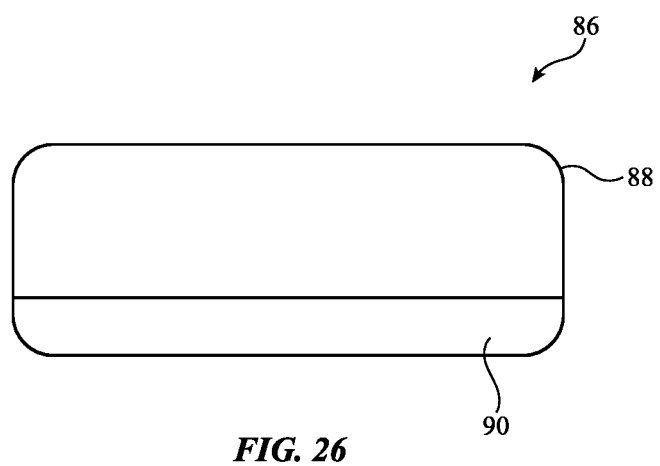
FIG. 26 is a side view of an illustrative charging case having an opaque portion in accordance with an embodiment.

FIG. 26 shows an example in which case 86 is opaque. Case 86 may, if desired, be configured to change opacity according to a given status. For example, case 86 may be transparent when empty and opaque when device(s) 10 are inside, or vice versa. As another example, case 86 may change opacity according to the level of charge contained in devices 10 (e.g., transparent when devices 10 have no charge and opaque when devices 10 are fully charged, or vice versa). The opacity of case 86 may be adjusted using light modulating structures such as liquid crystals, switchable filters, or other light modulating structures.

Figure 27:
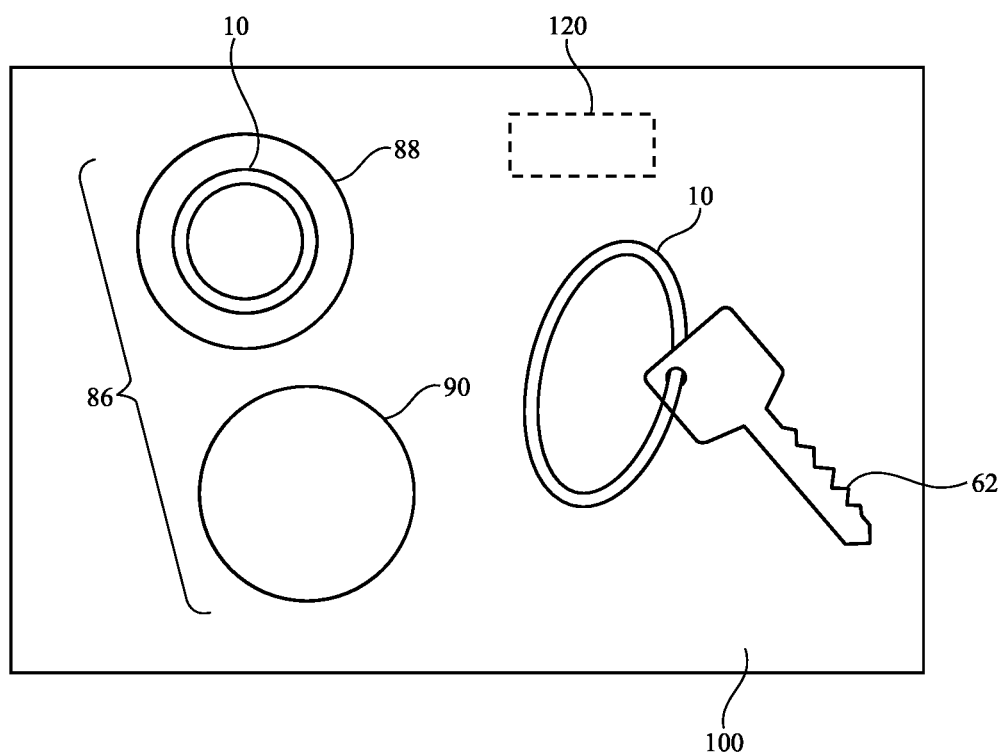
FIG. 27 is a top view of an illustrative charging mat that is used to wirelessly charge a charging case and loop-shaped wearable electronic devices in accordance with an embodiment.

If desired, device 10 and case 86 may be charged wirelessly on a wireless charging mat such as charging mat 100 of FIG. 27. Charging mat 100 may include wireless power transmitting circuitry 120 that supplies wireless power signals that are received by wireless power receiving circuitry 32 in device 10. If desired, case 86 may also include wireless power receiving circuitry that receives wireless power signals from charging mat 100. Wireless power transmitting circuitry 120 in mat 100 may transmit power wirelessly using inductive wireless power transfer, using capacitive wireless power transfer, and/or other wireless power transfer configurations (e.g., optical). With one illustrative configuration, wireless power receiving circuitry 32 in device 10 includes a wireless power receiving circuit having a coil (e.g., coil 34) and associated circuitry (e.g., one or more capacitors) and includes a rectifier that converts received alternating-current power signals from the wireless power receiving circuit to direct-current power for powering device 10. Wireless power receiving circuitry in case 86 may also include a wireless power receiving circuit having a coil and associated circuitry (e.g., one or more capacitors). In this type of configuration, wireless power transmitting circuitry 120 may include inverter circuitry that is used to supply alternating-current (AC) signals (e.g., alternating-current signals controlled via pulse-width modulation) to a wireless power transmitting circuit that includes one or more coils and one or more associated capacitors. During operation, the signals supplied by the inverter circuitry cause the coil(s) in the wireless power transmitting circuit to emit wireless power signals, which are received and converted to direct-current (DC) power by circuitry 32 in device 10 and by wireless power receiving circuitry in case 86.

Figure 28:
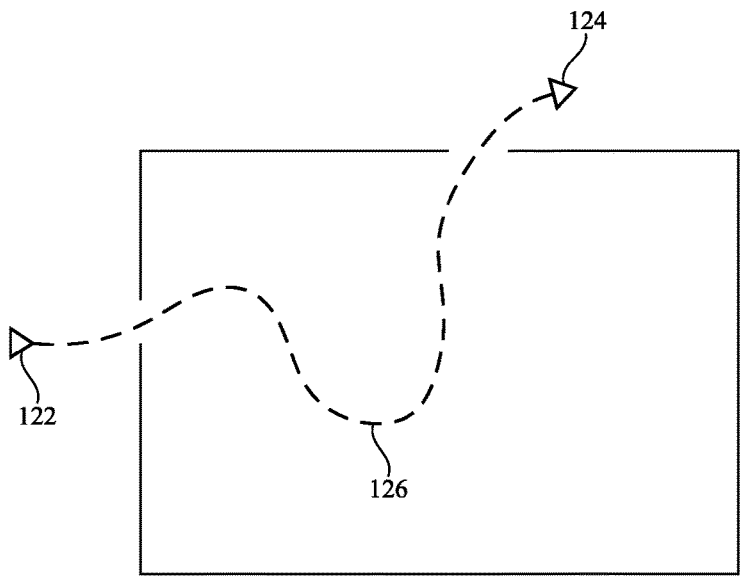
FIG. 28 is a diagram illustrating how a loop-shaped wearable electronic device may be used to track a motion path of a person, animal, or object that is wearing the loop-shaped wearable electronic device in accordance with an embodiment.
Figure 29:
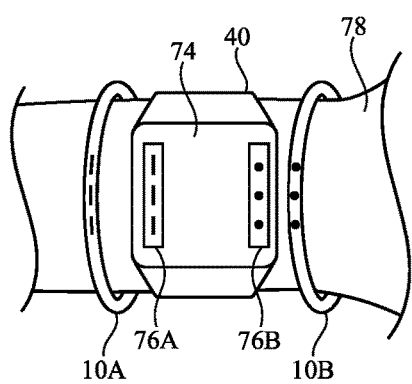
FIG. 29 is a perspective view of illustrative wrist-watch device displaying relative locations of nearby loop-shaped wearable electronic devices in accordance with an embodiment.
Figure 30:
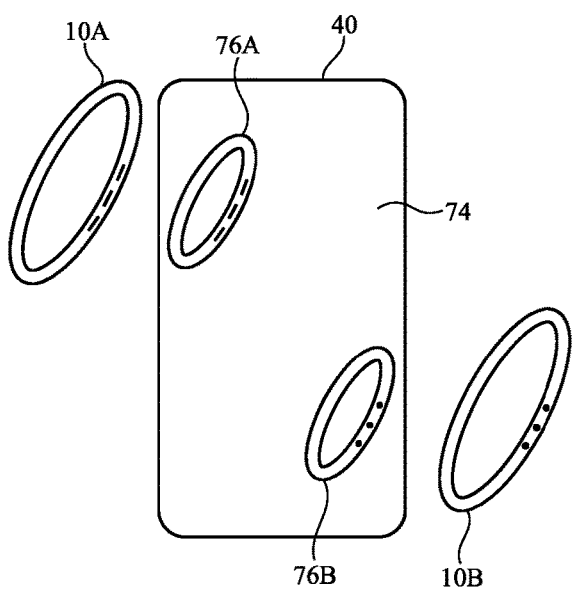
FIG. 30 is a perspective view of an illustrative electronic device displaying locations and orientations of nearby loop-shaped wearable electronic devices in accordance with an embodiment.

FIGS. 28, 29, and 30 illustrate how the location of device 10 may be tracked and conveyed to a user. In FIG. 28, device 10 moves along path 126 from point 122 to point 124. Along path 126, sensors in device 10 track the movement and location of device 10 (and thus the movement and location of the person, animal, or object to which device 10 is attached). This motion and location information may be stored in device 10 and/or may be conveyed to an external electronic device such as device 40 of FIG. 1. Motion and location information may, if desired, be processed to determine the type of activity being performed along motion path 126 (e.g., running, walking, cycling, stair climbing, etc.).

FIGS. 29 and 30 show how the location of device 10 relative to an external electronic device may be conveyed to a user through the external electronic device. In the example of FIG. 29, a user is wearing electronic device 40 between first and second electronic devices 10 such as device 10A and 10B. Electronic device 40 may be a wrist-watch or other electronic device having a display such as display 74. Display 74 may display images 76A and 76B corresponding to associated devices 10A and 10B, respectively. The locations of images 76A and 76B on display 74 may be based on the locations of devices 10A and 10B relative to device 40. For example, image 76A may be displayed on a left side of display 74 indicating device 10A is to the left of device 40, and image 76B may be displayed on a right side of display 74 indicating device 10B is to the right of device 40.

FIG. 30 shows that display 74 of device 40 may not only display the location of devices 10A and 10B relative to device 40, but may also display the orientations of devices 10A and 10B relative to device 40.

Figure 31:
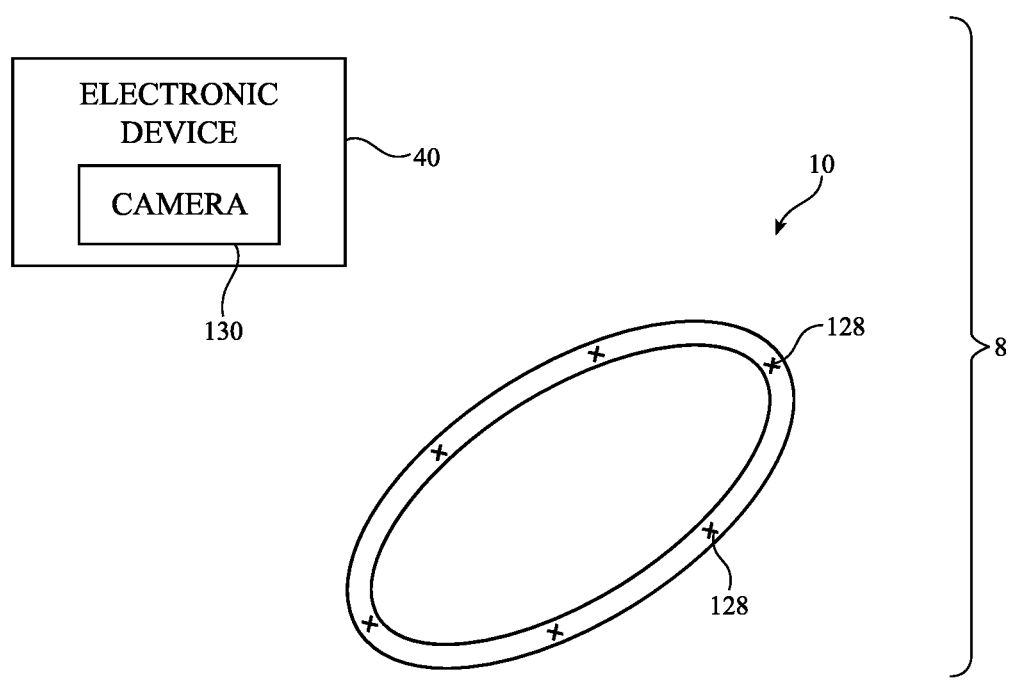
FIG. 31 is a diagram of an illustrative system including a loop-shaped wearable electronic device with markers that are tracked using a camera in an external electronic device in accordance with an embodiment.

As shown in FIG. 31, external equipment such as electronic device 40 in system 8 may contain sensors such as one or more cameras 130 (e.g., visual light cameras, infrared cameras, etc.). Electronic device 40 may, as an example, form part of an augmented reality (mixed reality) or virtual reality system (e.g., a system that includes a head-mounted device, glasses, a helmet, or other head-mountable support structures). Visual markers 128 may be placed on device 10 and, if desired, on other locations in the user's environment. Markers 128 may be, for example, passive visual markers such as bar codes, cross symbols, or other visually identifiable patterns and may be applied to device 10 and/or other objects such as a tabletop or other work surface.

Markers 128 may, if desired, include light-emitting components (e.g., visual light-emitting diodes and/or infrared light-emitting diodes modulated using identifiable modulation codes) that are detected using cameras. Markers 128 may help inform system 8 of the location of the user's virtual work surface and one or more of the user's fingers as a user is interacting with a computer or other equipment in system 8.

Visual markers 128 on device 10 and/or inertial measurement units in device 10 (e.g., accelerometers, compasses, and/or gyroscopes) may be used in tracking the hand locations (e.g., the locations of devices 10) relative to other markers in the user's work area. At the same time, system 8 may display associated visual content for the user. The user may interact with the displayed visual content by supplying force input, motion input (e.g., air gestures), taps, shearing force input, and other input gathered from device 10 by inertial measurement units in device 10 and/or force sensors and other sensors in device 10.

For example, information on the location of device 10 relative to other marks in system 8 may be gathered by control circuitry 42 in device 40 or other electronic equipment in system 8 (e.g., a computer, cellular telephone, or other electronic device coupled to device 40) during operation of system 8 while monitoring device 10 for force input, gesture input (e.g., taps, three-dimensional air gestures, etc.) that indicate that a user has selected (e.g., highlighted), moved, or otherwise manipulated a displayed visual element and/or provided commands to system 8. As an example, a user may make an air gesture such as a left hand wave to move visual content to the left. System 8 may use markers 128 and/or inertial measurement units in device 10 to detect the left hand wave gesture and can move visual elements being presented to the user with a display in device 40 in response to the left hand wave gesture. As another example, a user may select a visual element in the user's field of view by tapping on that element.

In this way, control circuitry in device 40, and/or other control circuitry in system 8 may allow a user to manipulate visual elements being viewed by the user (e.g., virtual reality content or other visual content being presented with a head-mounted device such as augmented reality googles or other device 40 with a display).

Markers 128 on device 10 may be formed from ink on cord 56 and/or housing unit 54, coatings on cord 56 and/or housing unit 54, surface features on cord 56 and/or housing unit 54, or other suitable structures in device 10. In arrangements where markers 128 are tracked with an infrared camera, marks 128 may be formed from infrared-reflective ink or coatings.

The foregoing is merely illustrative and various modifications can be made to the described embodiments. The foregoing embodiments may be implemented individually or in any combination.

What is claimed is:

1. A system, comprising:
   a first electronic device, comprising:
   a housing having a circular shape;
   a loop of material configured to couple the housing to an item;
   markers on at least one of the housing and the loop of material, wherein the markers comprise an infrared light-emitting diode; and
   an ultra-wideband transmitter in the housing configured to emit ultra-wideband signals; and
   a second electronic device comprising a head-mounted display and an infrared camera configured to capture images of the markers, wherein the second electronic device is configured to determine a location of the item based on at least one of the ultra-wideband signals and the captured images of the markers, and wherein the second electronic device comprises a display configured to display virtual reality content based on the location of the item.

2. The system defined in claim 1 wherein the loop of material comprises a material selected from the group consisting of: leather and polymer.

3. The system defined in claim 1 wherein the second electronic device is configured to determine a direction and a distance to the item based on the ultra-wideband signals.

4. The system defined in claim 1 wherein the second electronic device comprises a head-mounted electronic device.

5. The system defined in claim 1 wherein the first electronic device comprises a battery and a speaker in the housing.

6. The system defined in claim 1 wherein the second electronic device is configured to determine a location of an external electronic device using the first electronic device.

7. The system defined in claim 1 wherein the first electronic device is without a display and is configured to convey non-visual output.

8. The system defined in claim 1 wherein the first electronic device comprises Bluetooth® communications circuitry and near-field communications circuitry.

9. The system defined in claim 1 wherein the first electronic device serves as an anchor for the virtual reality content.

10. The system defined in claim 1 wherein the second electronic device is configured to determine an angle of arrival of the ultra-wideband signals and to determine the location of the item based on the angle of arrival.

11. A system, comprising:
    a first electronic device in a first location, the first electronic device comprising:
    a circular housing;
    a loop of material configured to couple the circular housing to an item; and
    wireless communications circuitry configured to receive a first signal from an external electronic device at a second location different from the first location; and
    a second electronic device in a third location that is different from the first and second locations, wherein the second electronic device is configured to receive a second signal from the first electronic device and to determine the second location of the external electronic device based on the second signal, wherein the second electronic device is configured to determine an orientation of the second electronic device relative to the external electronic device, and wherein the second electronic device comprises a display configured to display content that is adjusted based on the orientation of the second electronic device relative to the external electronic device.

12. The system defined in claim 11 wherein the first electronic device and the external electronic device form part of a mesh network.

13. The system defined in claim 11 wherein the first signal comprises a Bluetooth® signal.

14. The system defined in claim 11 wherein the first electronic device is without a display and is configured to convey non-visual output.

15. The system defined in claim 14 wherein the non-visual output comprises audio output.

16. A system, comprising:
    a first electronic device comprising:
    a curved housing;
    a loop of material configured to couple the curved housing to an item;
    a speaker in the curved housing; and
    wireless communications circuitry in the curved housing that is configured for ultra-wideband communications, Bluetooth® communications, and near-field communications; and
    a second electronic device configured to determine a direction and a distance to the item based on signals received from the first electronic device, wherein the signals comprise ultra-wideband signals, wherein the second electronic device is configured to determine an orientation of the second electronic device relative to the first electronic device based on an angle of arrival of the ultra-wideband signals, and wherein the second electronic device comprises a display configured to display content that is adjusted based on the orientation of the second electronic device relative to the first electronic device.

17. The system defined in claim 16 wherein the first electronic device is without a display and is configured to convey non-visual output.

18. The system defined in claim 17 wherein the non-visual output comprises audio output.

19. The system defined in claim 16 wherein the display is configured to display the direction and the distance to the item.

\* \* \* \* \*